(12) United States Patent
Gass, III et al.

(10) Patent No.: US 8,306,999 B2
(45) Date of Patent: Nov. 6, 2012

(54) COMPUTER-IMPLEMENTED SYSTEMS, METHODS, AND COMPUTER PROGRAM PRODUCT FOR PROVIDING ROW-LEVEL SECURITY IN A DATABASE NETWORK

(75) Inventors: Mark Kuebler Gass, III, Durham, NC (US); John Forrest Boozer, Cary, NC (US); Lawrence J. Noe, Chapel Hill, NC (US); James Patrick Kelley, Cary, NC (US); Diane Yang Hatcher, Cary, NC (US); Lisa Jo Weber, Apex, NC (US)

(73) Assignee: SAS Institute Inc., Cary, NC (US)

( * ) Notice: Subject to any disclaimer, the term of this patent is extended or adjusted under 35 U.S.C. 154(b) by 635 days.

(21) Appl. No.: 12/054,016

(22) Filed: Mar. 24, 2008

(65) Prior Publication Data
US 2008/0235231 A1    Sep. 25, 2008

Related U.S. Application Data

(60) Provisional application No. 60/919,815, filed on Mar. 23, 2007.

(51) Int. Cl.
*G06F 17/30*    (2006.01)
(52) U.S. Cl. .......................................... 707/781; 707/802
(58) Field of Classification Search .................. 707/781, 707/802
See application file for complete search history.

(56) References Cited

U.S. PATENT DOCUMENTS

| | | | | |
|---|---|---|---|---|
| 6,405,212 | B1* | 6/2002 | Samu et al. | 1/1 |
| 6,631,497 | B1* | 10/2003 | Jamshidi et al. | 715/205 |
| 6,820,082 | B1* | 11/2004 | Cook et al. | 707/754 |
| 7,243,097 | B1* | 7/2007 | Agrawal et al. | 1/1 |
| 2004/0044655 | A1* | 3/2004 | Cotner et al. | 707/3 |
| 2007/0220004 | A1* | 9/2007 | Fifield et al. | 707/9 |

OTHER PUBLICATIONS

Gass, Mark, "Row-Level Permissions for Web-based Reporting in 3.1 BI Suite," SAS Users Group International, San Francisco, 35 pp. (Mar. 26-29, 2006).
SAS Institute Inc., "SAS® 9.1.3 Intelligence Platform: Security Administration Guide," Cary, North Carolina, 231 pp. (Mar. 8, 2006).
SAS Institute Inc., "SAS® 9.1.3 Intelligence Platform: Security Administration Guide Second Edition," Cary, North Carolina, 237 pp. (Sep. 15, 2006).

\* cited by examiner

*Primary Examiner* — Son T Hoang
(74) *Attorney, Agent, or Firm* — Jones Day

(57) ABSTRACT

Computer-implemented systems and methods for providing row-level security. A system can be configured to receive a request for data that is contained in tables and to use one or more row-level security policies to augment the received request with one or more row-level security query-related clauses.

12 Claims, 36 Drawing Sheets

Edit Filter

Filter name: ManagedByMe
Description:
Data item: <<BOSS_SECURITY.SAS_EXTERNAL_IDENTITY>>     Edit Data Item...
Condition: Is equal to
Value(s):

Derive identity values (for row-level permissions)

Select a property. An identity-specific value for the property will be substituted into the filter each time the filter is executed.

| Property | Description | Example |
|---|---|---|
| SAS.PersonName | The user name as defined in metadata | Marcel Dupree |
| SAS.IdentityGroupName | The group name as defined in metadata | |
| SAS.IdentityName | The user or group name as defined in metadata | Marcel Dupree |
| SAS.Userid | The authenticated user ID | ORMARCEL@SUGI31089 |
| SAS.ExternalIdentity | A site-specific external identifier | 531531 |

Add ▽   Update ▽   Combinations ◁◁   Edit △

<<BOSS_SECURITY.SAS_EXTERNAL_IDENTITY>>=(&SAS.ExternalIdentity)

Group( )   Split   △   ▽   Delete

Filter combinations:

AND   OR   NOT

+ Filter expression:

OK   Cancel   Help

Authorization

Information map name: OrionSalesRLP

Names:
- SAS System Services
- SASUSERS
- SAS Administrator
- SAS Web Administrator
- Portal Admins
- PUBLIC
- ITPerimeter
- International

[Add...] [Remove]

[Access Control Templates] [Properties] [Add Condition...]

| Permissions | Grant | Deny |
|---|---|---|
| ReadMetadata | ☑ | ☐ |
| CheckInMetadata | ☐ | ☑ |
| Create | ☐ | ☑ |
| Administer | ☑ | ☐ |
| WriteMetadata | ☑ | ☐ |
| Read | ☐ | ☐ |
| Write | ☐ | ☑ |
| Delete | ☐ | ☑ |

[Help] [Close]

*Web Report Studio : View Report - Microsoft Internet Explorer*

File Edit View Favorites Tools Help

Address http://sugi31089.na.sas.com:8080/SASWebReportStudio/launchReportViewer.do?reportAcc Go | Links Manage | Preferences | Log Off | Help Welcome Dennis Lansberry

SAS Web Report Studio    QuantityOrderedByProductLine

How Do I?

Report    Edit Report    View Report    Refresh Data

| Product Line | Quantity Ordered |
|---|---|
| Children | 5520 |
| Clothes & Shoes | 3788 |
| Outdoors | 148204 |
| Sports | 52352 |
| Total | 209864 |

| ORDERS | |
|---|---|
| EmpID | Orders |
| 1234 | 245 |
| 5151 | 306 |
| 2233 | 75 |
| 5678 | 75 |
| 5151 | 180 |
| 1234 | 224 |
| 1234 | 79 |

| EMPLOYEE_INFO | |
|---|---|
| SASPersonName | EmpID |
| Tara O'Toole | 1234 |
| Joe Smith | 5151 |
| Marcel Dupree | 2233 |
| Henri LeBleu | 5678 |

*Fig. 20*

| ☐ New Filter | ☒ |
|---|---|
| F̲ilter name: ByPersonName | |
| Description: | |
| Data i̲tem: <<SECURITY_ASSOC.PARENT_EMPLOYEE_NAME>> ⌄ | Edit Data Item... |
| Con̲dition: Is equal to ⌄ | |

Value(s):

Derive identity values (for row-level permissions) ⌄

Select a property. An identity-specific value for the property will be substituted into the filter each time the filter is executed.

| Property | Description | Example |
|---|---|---|
| SAS.PersonName | The user name as defined in metadata | SAS Demo User |
| SAS.IdentityGroupName | The group name as defined in metadata | |
| SAS.IdentityName | The user or group name as defined in metadata | SAS Demo User |
| SAS.Userid | The authenticated user ID | SASDEMO@SUG534 |
| SAS.ExternalIdentity | A site-specific external identifier | |

C̲ombinations ▷▷

[ OK ]  [ Cancel ]  [ H̲elp ]

⊞ Filter expression:

☒ Authorization

Information map name: SalaryByPersonName (with AuthBased Prefilter)

Names:
- SAS System Services
- PUBLIC
- SAS Administrator

[Add...] [Remove]

[Access Control Templates] [Properties] [Add Condition...]

| Permissions | Grant | Deny |
|---|---|---|
| ReadMetadata | ☐ | ☐ |
| CheckInMetadata | ☑ | ☐ |
| Create | ☐ | ☑ |
| Administer | ☐ | ☐ |
| WriteMetadata | ☑ | ☐ |
| Read | ☑ | ☐ |
| Write | ☐ | ☑ |
| Delete | ☐ | ☑ |

[Close] [Help]

Authorization

Information map name: SalaryByPersonName (with AuthBased Prefilter)

Names:
- SASUSERS
- SAS System Services
- HR All Salaries
- PUBLIC
- SAS Administrator

[Add...] [Remove]

[Access Control Templates] [Properties] [Add Condition...]

| Permissions | Grant | Deny |
|---|---|---|
| ReadMetadata | ☑ | ☐ |
| CheckInMetadata | ☐ | ☑ |
| Create | ☐ | ☐ |
| Administer | ☑ | ☐ |
| WriteMetadata | ☐ | ☑ |
| Read | ☐ | ☐ |
| Write | ☐ | ☑ |
| Delete | ☐ | ☑ |

[Close] [Help]

COMPUTER-IMPLEMENTED SYSTEMS, METHODS, AND COMPUTER PROGRAM PRODUCT FOR PROVIDING ROW-LEVEL SECURITY IN A DATABASE NETWORK

CROSS-REFERENCE TO RELATED APPLICATION

This application claims priority to and the benefit of U.S. Patent Application Ser. No. 60/919,815 (entitled "A Method For Defining Row-Level Security Policies In End-User Dynamic Query Tools" and filed on Mar. 23, 2007), of which the entire disclosure (including any and all figures) is incorporated herein by reference.

TECHNICAL FIELD

This document relates generally to database accessing and more particularly to computer-implemented systems and methods for secure database access.

BACKGROUND

Row-level security is an application of data security to control access to particular rows in a relational data query. The general row-level security problem is to define and enforce policies for access to particular rows identified in relational data queries. Industry-standard security authorization techniques (object-level access control entries) have not been applied because the large number of rows makes individual row-by-row access control operationally and administratively impractical.

Instead, typical industry practice has addressed row-level security by either creating fixed relational VIEWs on a table-by-table basis or by writing server-side procedural programs ("stored procedures") to select records on each query.

A deficiency of these conventional approaches is that they require programming either in a query-language like SQL or in a procedural language. This has kept row-level security policy administration a separate activity that is not integrated (in terms of tools and of security administrator skill set) with the broader data access security technologies used in an organization.

Another deficiency of conventional techniques is that they deal with row-level security policy in the context of individual input data sources, rather than at the broader multi-table level. This is a significant deficiency because modern relational data warehouse designs (notably STAR schemas) involve many tables and envision considerable user flexibility in querying against them. Hence policies are most naturally expressed in terms of the full set of potential queries that a user might make against a combination of tables.

Because providing guidance about the effective patterns for generating ad-hoc queries against particular multi-table data models is beyond the scope of the SQL standard, the industry has evolved proprietary query metadata frameworks to guide end-users in creating queries. These frameworks provide metadata for other types of policy controls—such as rules for generation of meaningful queries and column-level data security. But while such frameworks are capable of being used with data sources that have row-level security applied individually, the frameworks have not integrated row-level security policy definition at this higher, multi-table level.

Accordingly, row-level security-policy definition has previously been a specialized activity which focused on individual data sources. As a result, it has not been integrated either with conventional security frameworks or with the higher-level (multi-table) query policy tools that are increasingly used to guide and govern ad-hoc query against data warehouses.

BRIEF DESCRIPTION OF THE DRAWINGS

FIG. 8 is a graphical user interface showing an example of declarative definition of filters.

FIG. 10 is a graphical user interface showing a dialog window for creating an access control entry.

FIGS. 13 and 14 are reports wherein differing level of detail is provided to two different users because of row-level security policies.

FIG. 19 depicts a target table.

FIG. 20 depicts a security associations table.

FIGS. 26-32 depict graphical user interfaces for use in row-level security applications.

FIGS. 34-39 depict graphical user interfaces for use in row-level security applications.

SUMMARY

In accordance with the teachings provided herein, systems and methods for operation upon data processing devices are provided for providing row-level security. For example, a system and method can be configured to receive a request for data that is contained in tables and to use one or more row-level security policies to augment the received request with one or more row-level security query-related clauses.

As another example, a system and method can be configured to receive a request for data that is contained in tables and to use one or more row-level security policies to augment the received request with one or more row-level security query-related clauses. The definition of the one or more row-level security policies is performed when defining multi-table data models, wherein a multi-table data model associates one or more row-level security policies with the tables. The defining of multi-table data models includes defining non-security related query policies and query guidance metadata. The tables are queried based upon the received request that has been augmented with the one or more row-level security query-related clauses. A user or a program is provided with results of the querying based upon the augmented data query.

DETAILED DESCRIPTION

Figure 1:
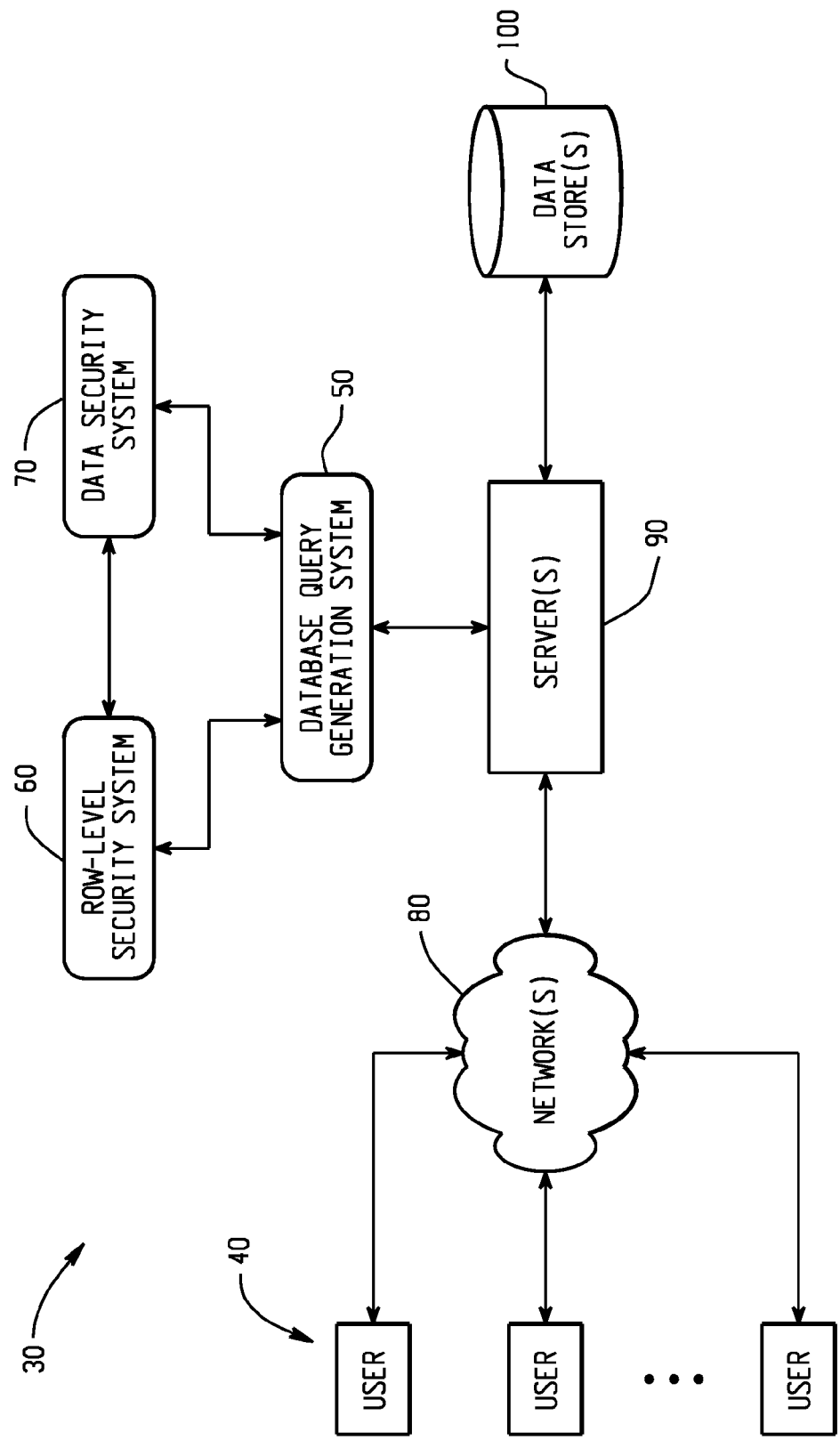
FIG. 1 is a block diagram depicting an environment wherein users can interact with a database query generation system in order to access information stored in one or more computer-implemented data store(s).

FIG. 1 depicts at 30 an environment wherein users 40 can interact with a database query generation system 50 in order to access information stored in one or more computer-implemented data store(s) 100. As a mechanism to protect the access of the information stored in the data store(s) 100, the database query generation system 50 can utilize a row-level security system 60. The row-level security system 60 handles row-level permissions in order to provide control beyond setting mere permissions on libraries, tables, and columns that may be contained in the data store(s) 100. For example, the row-level permissions can define access to such data at a granular level, such as specifying who can access particular rows within a table. Row-level permissions can be used to subset data by a user characteristic such as employee ID or organizational unit. As an illustration, a table that contains patient medical information might be protected by row-level permissions that enable each doctor to see only those rows that contain data about that doctor's patients.

Systems 50 and 60 can also interact with a data security system 70 which provides a data access security framework for authorization of users 40. The data security system 70 could include such authorization techniques as the approach described in the following commonly owned patent document (which is incorporated herein by reference including any and all figures): U.S. patent application Ser. No. 10/413,452 (entitled "Computer-Implemented Data Access Security System And Method" filed on Apr. 14, 2003). Therein, a data security system is described which receives a request and examines whether the requester should be granted access to all or any of the requested information as well as what kinds of operations the requester may perform on that information. The data security system 70 could also include such other authorization techniques as the approach described in the following commonly owned patent document (which is incorporated herein by reference including any and all figures): U.S. patent application Ser. No. 11/092,138 (entitled "Computer-Implemented Authorization Systems and Methods Using Associations" filed on Mar. 29, 2005).

The users 40 can interact with the database query generation system 50 through a number of ways, such over one or more networks 80. Server(s) 90 accessible through the network(s) 80 can host the system 50 (as well as the other systems 60 and 70). It should be understood that the systems 50, 60, and 70 could also be provided on a stand-alone computer for access by a user.

Figure 2:
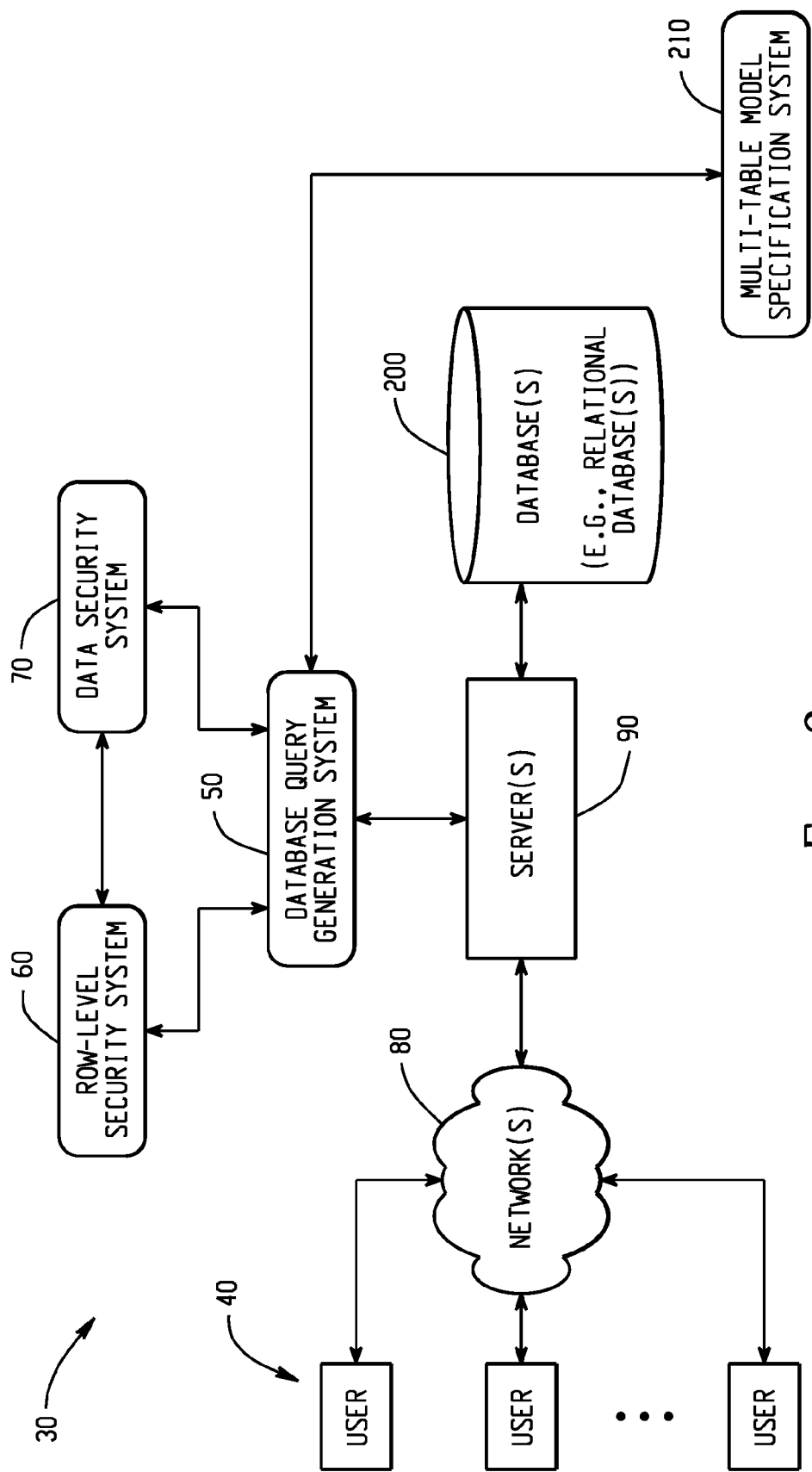
FIG. 2 is a block diagram depicting an example of a type of data store that can be used with a database query generation system.

FIG. 2 provides at 200 an example of a type of data store that can be used within the environment 30. In this example, the database query generation system 50 can access the information stored in one or more relational databases 200. The row-level security system 60 can define access to the data contained in the tables of the relational database(s) 200 at a granular level, such as specifying who can access particular rows within a table. The system's row-level security policy definition can be integrated into conventional (ACL-based) security systems as well as into query guidance definition tools and runtime query execution.

Figure 3:
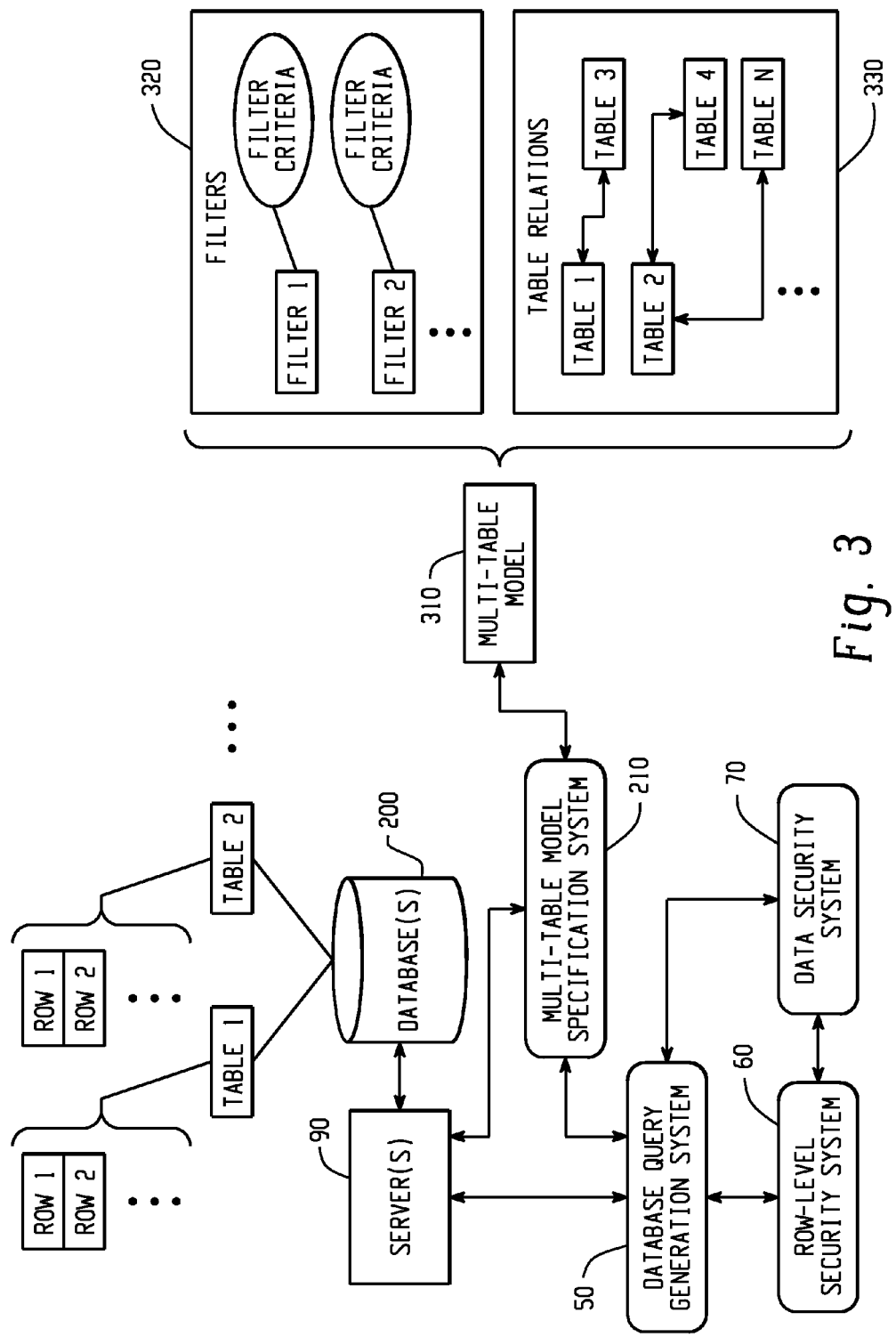
FIGS. 3 and 4 are block diagrams depicting examples of a multi-table model specification system.

To facilitate access to the information stored in a relational database, the database query generation system 50 uses a multi-table model specification system 210. FIG. 3 provides an example of a multi-table model specification system 210 which designates through a multi-table model 310 (e.g., an information map) how tables interrelate with each other when data is to be queried from the database(s) 200. In addition to the specification 330 of table relations, the information map can further specify filters 320 that establish criteria for filtering data that is to be retrieved via a query. As an example, the information map can list a number of tables as data sources along with rules for combining multiple tables in a relational JOIN operation. One or more filters 320 can be associated with the table relations in order to restrict what information is retrieved.

Figure 4:
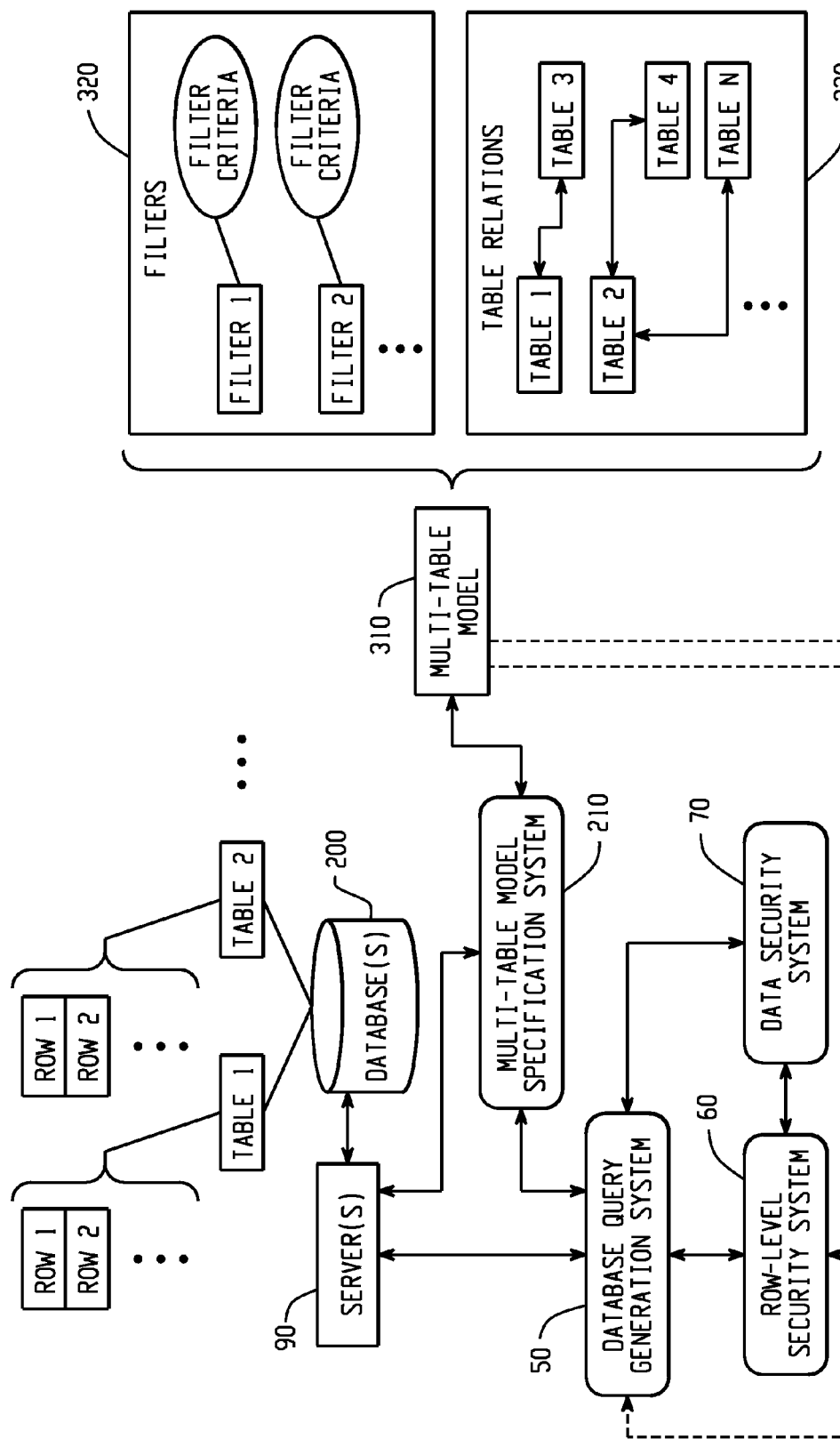
Figure 5:
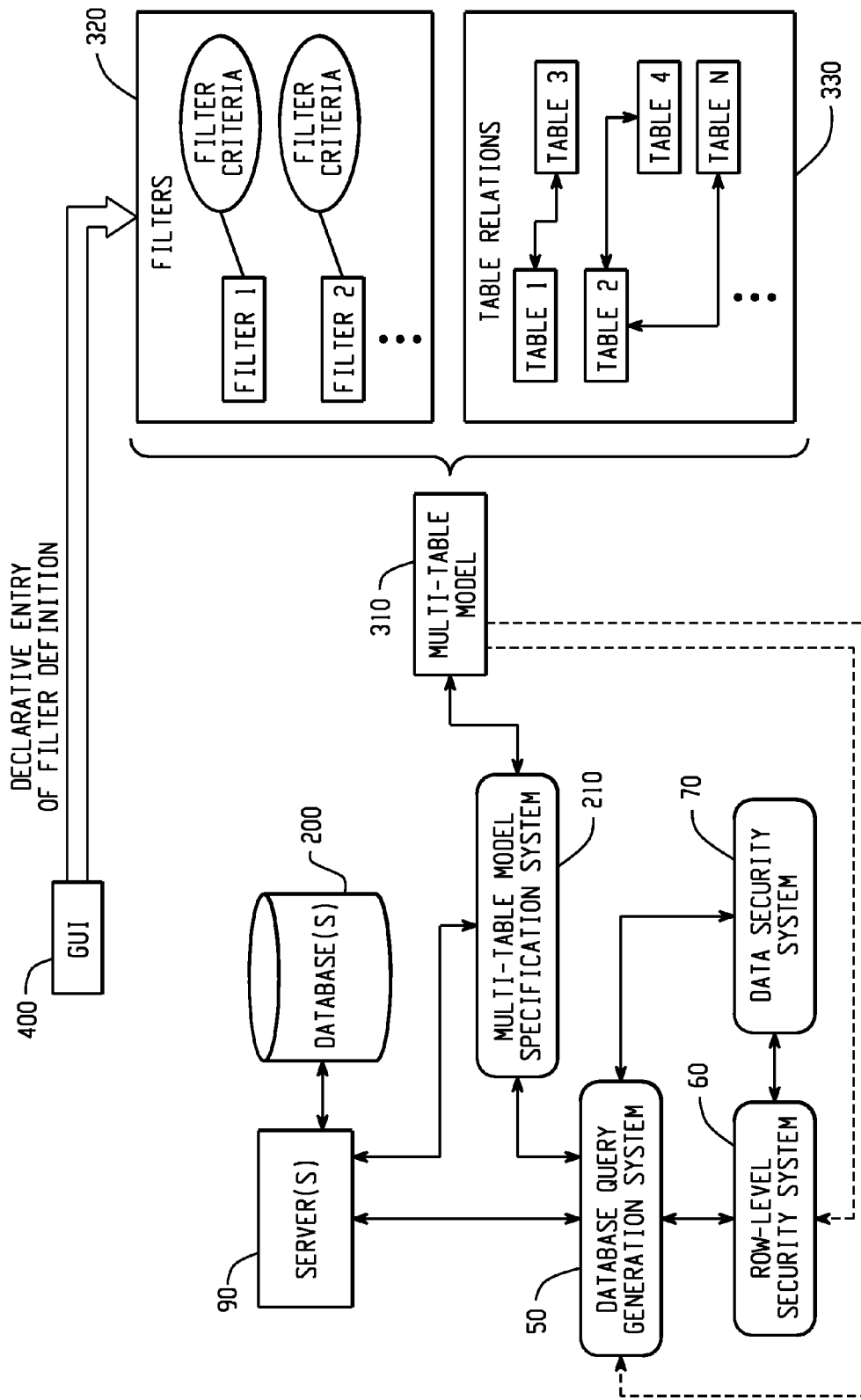
FIGS. 5 and 6 are block diagrams depicting graphical user interfaces for a user to specify input in a declarative manner.
Figure 6:
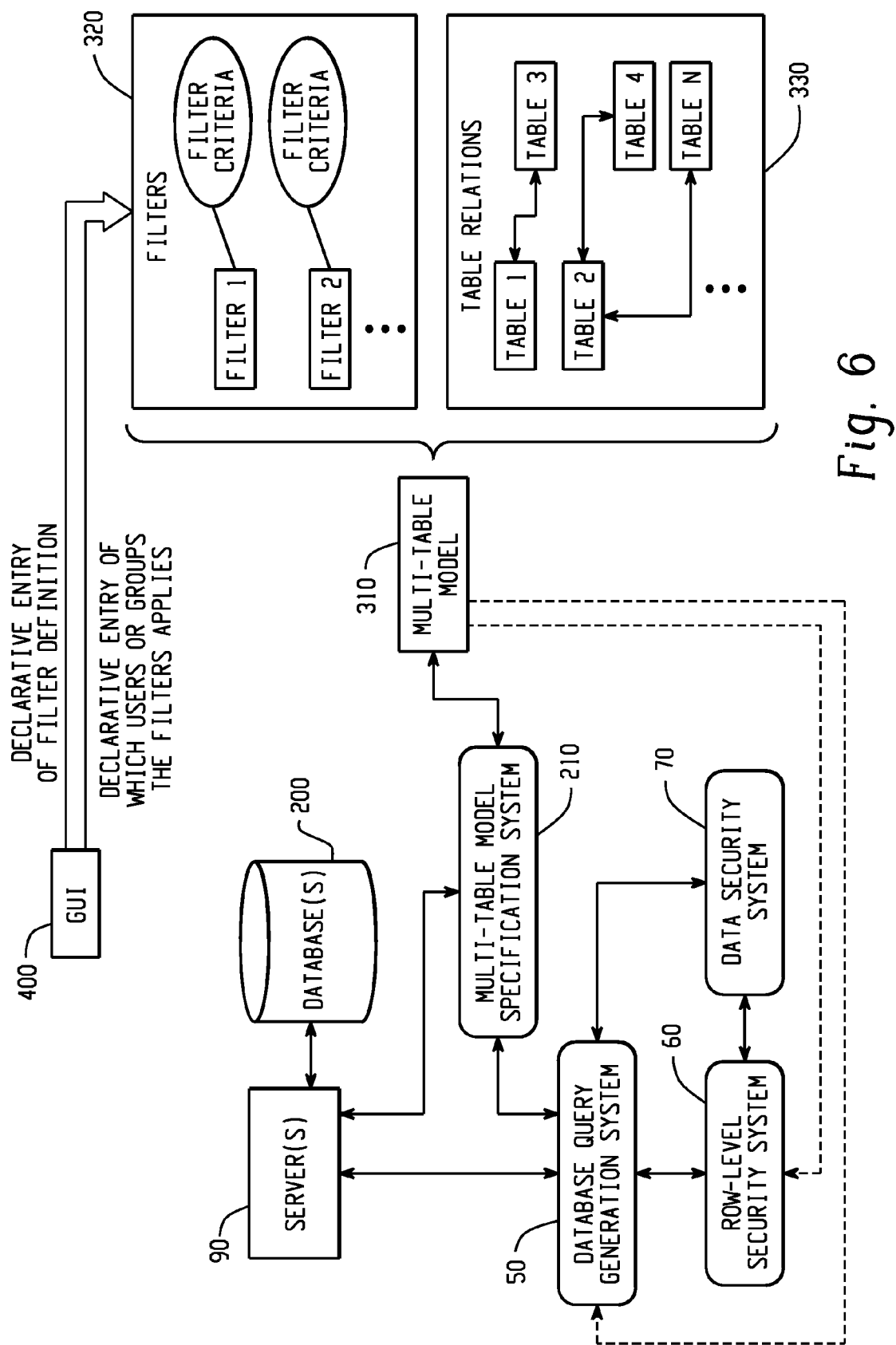

FIG. 4 illustrates that the same multi-table model 310 or information map that is used by the database query generation system 50 to handle query requests from users can also be used by the row-level security system 60 to define row-level security policies for constraining queries (e.g., ad-hoc queries) which end-users make against a collection of tables. With respect to row-level security policies, FIG. 5 depicts a graphical user interface (GUI) 400 for a user to specify in a declarative manner both WHERE-based and JOIN-based filtering in defining row-level security policies. FIG. 6 shows that the GUI 400 can also permit declarative definition of filters which vary based on identity attributes derived from an authentication system. It is noted that declarative specification in this context involves a more user-friendly manner for the creation of a set of conditions (e.g., WHERE-based filtering), and uses another program or routine to interpret and implement such user-specified conditions.

As an illustration, FIGS. 7-14 provide an example scenario for specifying row-level permissions through a declarative approach. With respect to FIG. 7, a GUI is depicted at 500 for editing policies for access queries against a star schema 510 representing orders in a retail industry data mart. Individual tables (e.g., data sources) are listed (with their columns) in subwindows with permitted JOIN associations 520 drawn graphically. For example, the BOSS_SECURITY table 530 is shown and has multiple columns therein, such as the SAS_EXTERNAL_IDENTITY column 540. In this figure, the allowed relationships are all INNER JOINs, which are represented graphically using a symbol of two overlapping circles with their intersection shaded.

Figure 7:
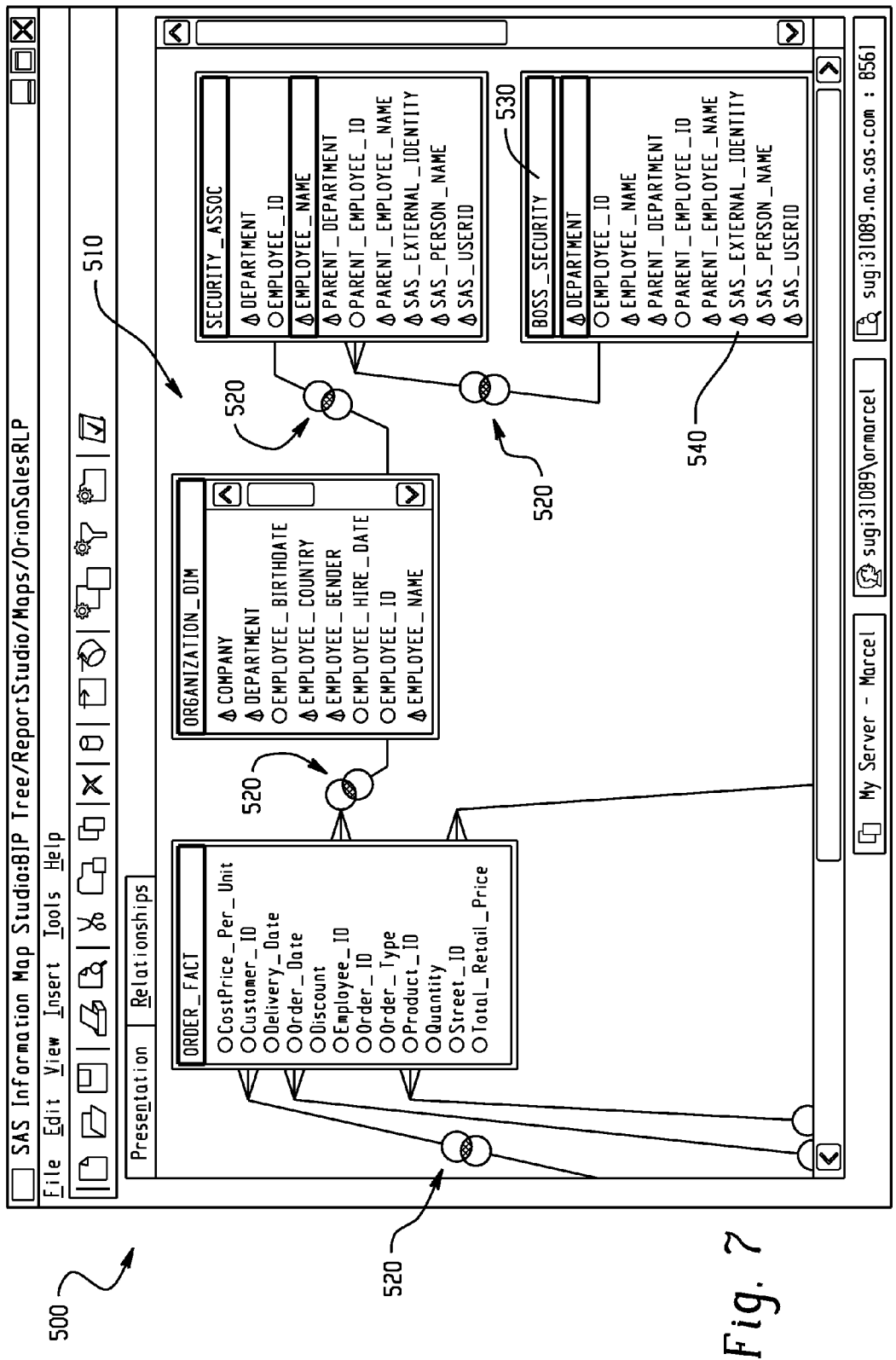
FIG. 7 is a graphical user interface showing multiple data sources with allowed join relationships.

FIG. 8 depicts a GUI 600 for the declarative definition of filters that are meaningful for the particular tables shown in FIG. 7. The filters are can be either user-selectable, or required as a matter of policy. In this example, GUI 600 defines an identity-based filter wherein:

1) The filter is one that will be used to control row-level security policy.
2) The filter is parameterized based on user identity, as provided by the authentication subsystem. The "SAS.ExternalIdentity" variable reference in the filter will be substituted at runtime with the employee ID of the accessing user.

In this example, the net effect is that a single filter is created that will subset an organization hierarchy table in order to show only employees that report to the user who is running an ad-hoc report. Further, this example shows a particular filter whose runtime form varies based on the accessing client. Although many filters defined in an information map are optional components for use by a report designer, those filters intended for row-level security are applied automatically based on security policies designed by a Security Administrator in conjunction with Business Analysts (because such security policies are a form of business rule) and defined in the map by an Information Analyst.

In choosing when such filters are applied to queries, an Information Analyst has at least two options:

1) General prefilters: Apply the filter when an end user report access the corresponding table at runtime.
2) Authorization-based prefilters: Consult the relevant access control entry for the map to see if there is a permission condition that would require the application of a filter. The "relevant access control entry" is stored and chosen by the authorization subsystem. An access control entry for the specific user will be chosen first. If there is not an entry for the specific user, an access control entry for one of the user's groups can be used. Groups which are members of other groups form a precedence level during access control entry selection. Only groups from the highest precedence level are used. If there are multiple such groups with permission conditions, then a filter is created that returns a union of records available to the individual groups.

Figure 9:
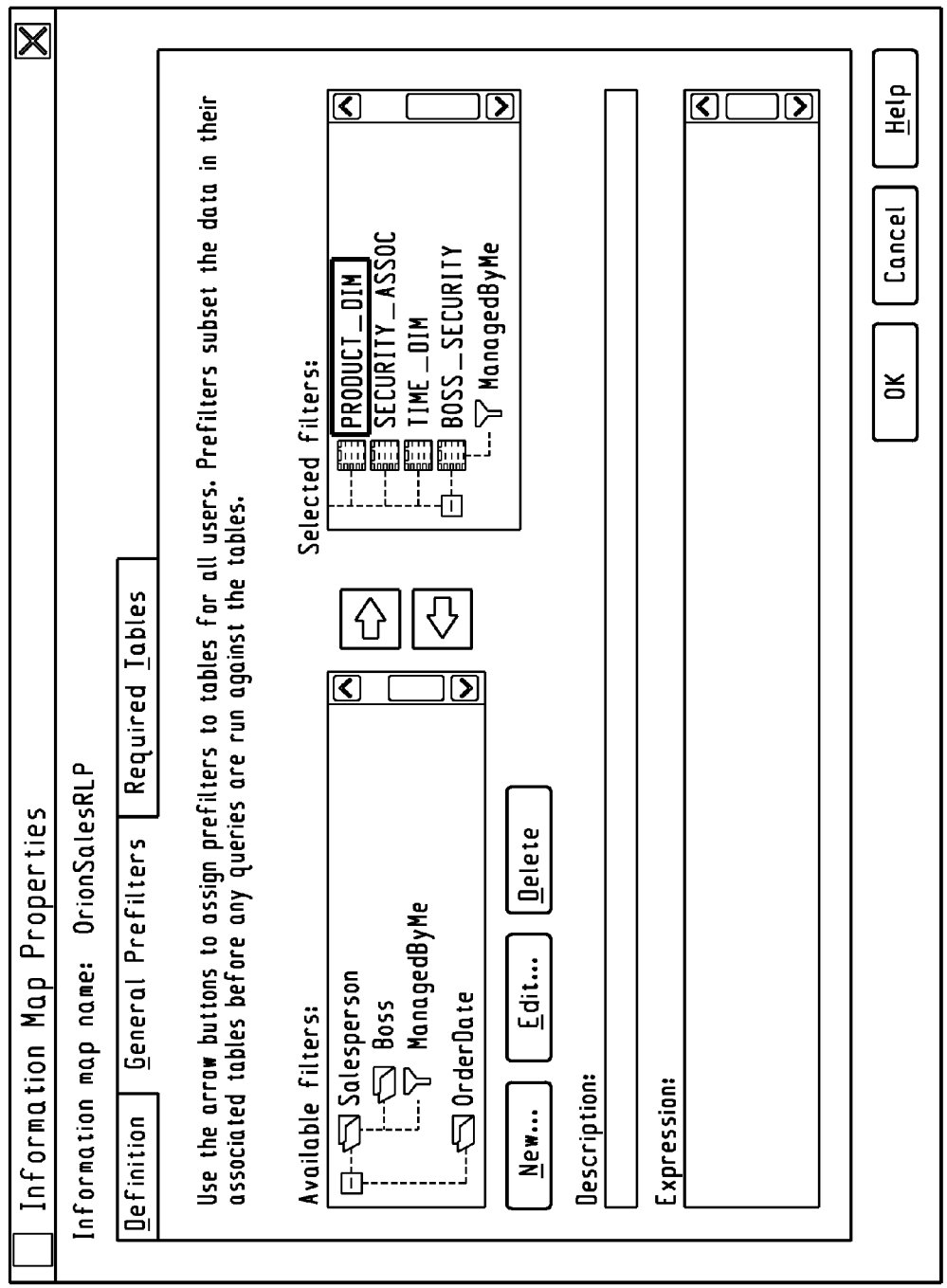
FIG. 9 is a graphical user interface showing a general prefilter called "managedbyme."

FIG. 9 shows at 700 the first of the GUIs for the application of a general prefilter. This figure depicts that the general prefilter "managedbyme" governs access to the BOSS_SECURITY Table. The policy is that the "ManagedByMe" prefilter will be applied any time that the BOSS_SECURITY data source is used in a query.

Figure 11:
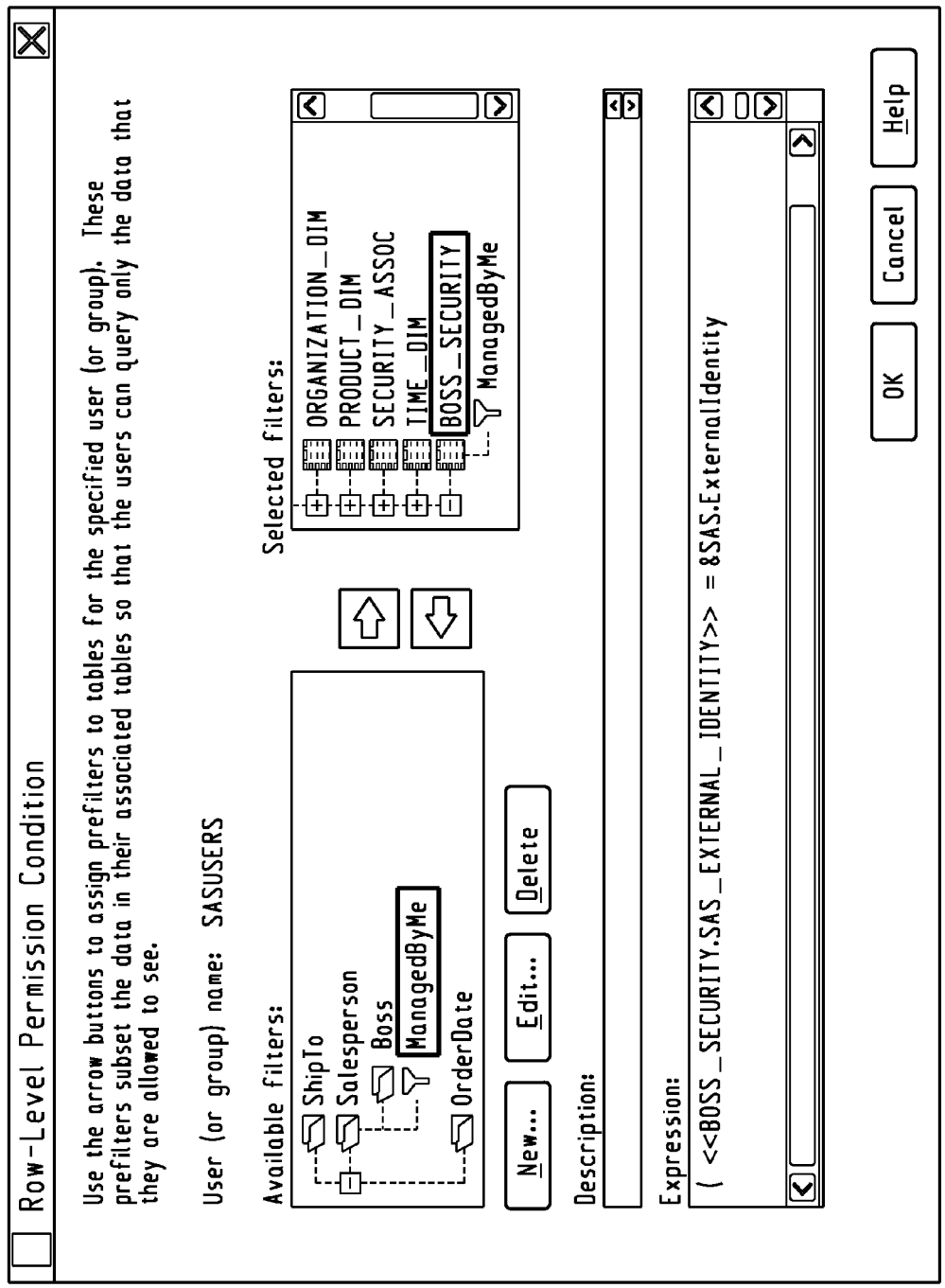
FIG. 11 is a graphical user interface wherein a permission condition applies the ManagedByMe filter to any use of the BOSS_SECURITY table by members of the group "SASUSERS."

FIGS. 10 and 11 show GUIs for the definition of an authorization-based prefilter. This uses a standard authorization policy definition mechanism. More specifically, FIG. 10 depicts at 800 a standard authorization policy dialog for creating an access control entry with Conditional Read permission against the OrionSalesRLP Information Map. FIG. 11 shows at 900 a permission condition applying the ManagedByMe Filter to any use of the BOSS_SECURITY table by members of the group "SASUSERS".

Figure 12:
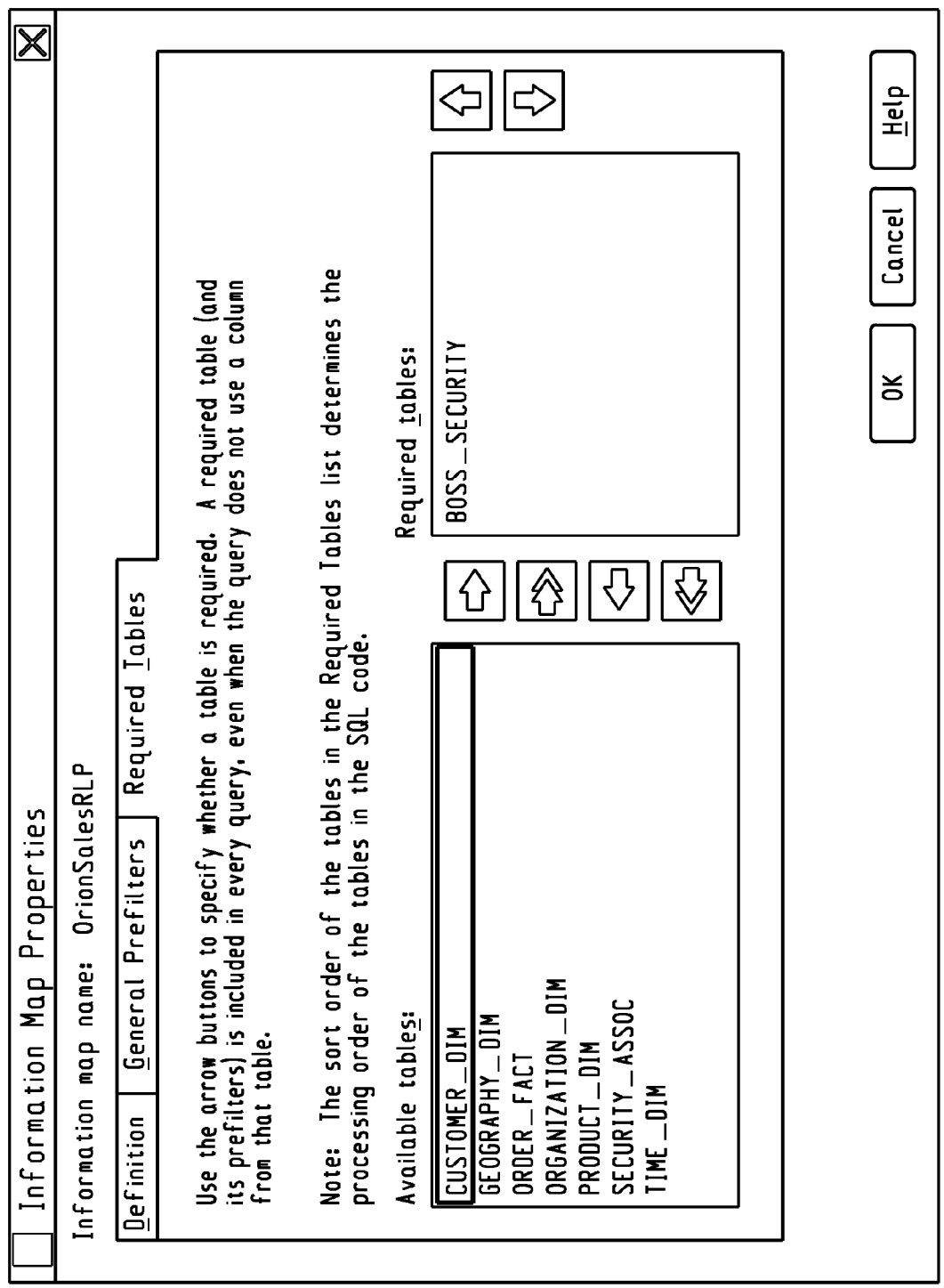
FIG. 12 is a graphical user interface wherein the BOSS_SECURITY table is defined as a required table.

The permission condition is applied to READ access by members of the SASUSERS group. FIG. 12 shows at 1000 the GUI for enforcing this filter ("ManagedByMe") on access to the BOSS_SECURITY tables. The GUI is the same as for a General Prefilter, but is now applied only when the accessing user is a member of the "SASUSERS" group.

FIG. 12 illustrates that BOSS_SECURITY is defined as the required table. Required tables are joined to every query against the information map. Like filters, these can be applied for all users of the maps (general required tables) or as indicated by permission conditions on pertinent access control entries (authorization-based required tables). (The general application of required tables is illustrated at 1100 in FIG. 13.)

The net effect of these policy definitions is the ability to ensure that, regardless of what set of tables a user queries, the organization's row-level security policies will be applied. In this example and as shown in FIGS. 13 and 14, the user will see only orders that are sold by either the user himself or (if he is a manager) one of his employees (direct or indirect via subordinate managers).

Figure 14:
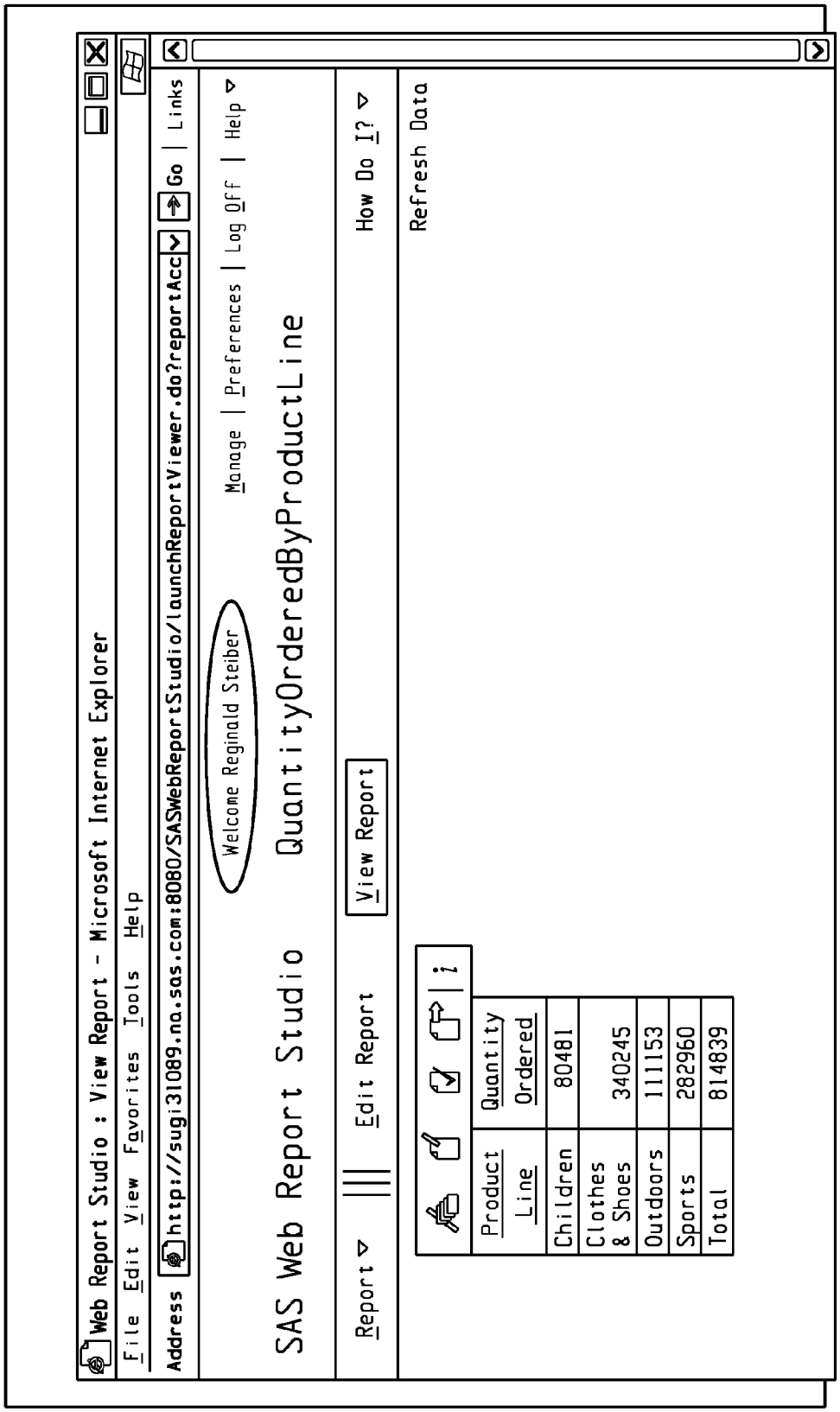

FIGS. 13 and 14 show identical reports for two sales managers—Dennis Lansberry and Reginald Steiber—where one manager (Dennis) reports to the other (Reginald). Thus, the orders data for Dennis is a subset of that available to Reginald. More specifically, FIG. 13 illustrates row-level security policies being applied automatically during end user report generation wherein a lower-level manager sees fewer rows in the underlying data; and FIG. 14 illustrates row-level security policies being applied automatically during end user report generation wherein a higher-level manager sees more rows in the underlying data (i.e., the higher-level manager has a larger number of rows that are visible to him and thus his report reflects summaries based upon more data/rows).

These figures also represent the integrated access with the reporting GUI. Report designers do not select row-level security policy. It is applied to their reports automatically behind the scenes.

The SQL that would be generated to JOIN tables and GROUP categories is augmented as shown below with extra JOINs as necessary to bring in the BOSS_SECURITY table, and a prefilter is added to that table. Furthermore, the SQL for the prefilter is created based on the employee-ID ('531531) of the access user (i.e., Dennis in this case).

```
{...}
Inner join ORGANIZATION_DIM on EMPLOYEE_ID
Inner join SECURITY_ASSOC AS SALESPERSON on
EMPLOYEE_ID
Inner join (  /* Prefiltered table replaced by sub-query */
    SELECT EMPLOYEE_ID FROM
        SECURITY_ASSOC as BOSS WHERE
        (BOSS.SAS_EXTERNAL_IDENTITY ) = '531531'
) on SALESPERSON.PARENT_EMPLOYEE_ID=
BOSS.EMPLOYEE_ID
```

It should be understood that the user interface can be configured in different ways, such through a step-wise wizard. For example, the data used to formulate the query of the data in the tables is generated from data acquired piecewise through a step-wise wizard.

Figure 15:
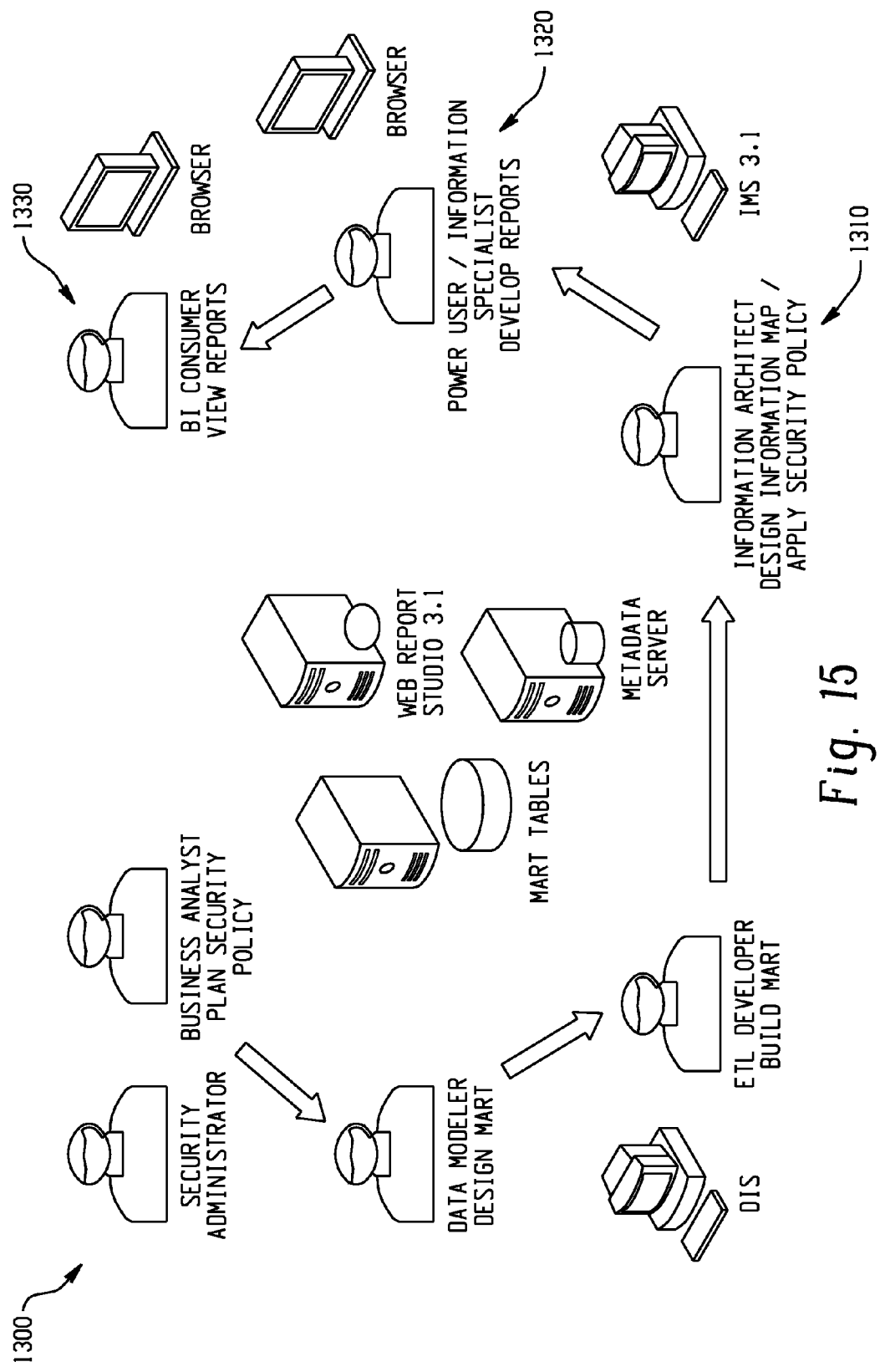
FIG. 15 depicts typical roles in an organization that is deploying an end-user reporting environment.

FIG. 15 illustrates at 1300 the typical roles in an organization which is deploying an end-user reporting environment. With the row-level security approaches described herein, an information architect 1310 can define row-level security policies at the same time as other query policies. These policies are then automatically applied when a power user or information specialist 1320 develops reports or when an end-user 1330 views reports.

Figure 16:
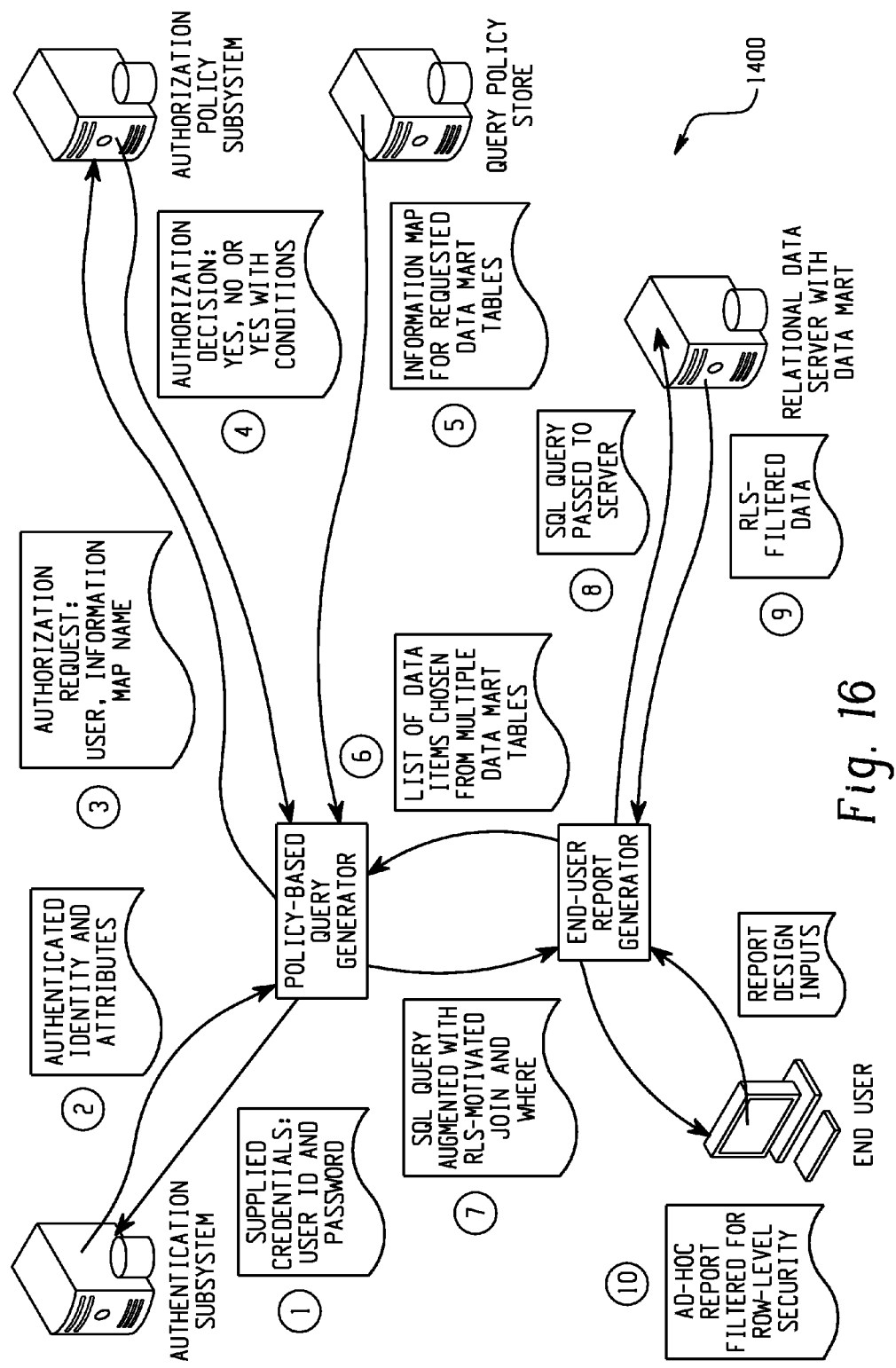
FIG. 16 depicts a process flow by which a policy can be identified and enforced.

FIG. 16 illustrates at 1400 an example of a process flow by which a policy can be identified and enforced. In step 1 of the process flow, a policy-based query generator (which is an example of a database query generation system) supplies user identification and password information as credentials to an authentication subsystem, and at step 2, the authenticated identity and attributes are returned to the policy-based query generator. After authentication, authorization processing proceeds, wherein at step 3, the policy-based query generator provides an authorization request which contains such information as user and information map identification information (e.g., information map name).

The authorization policy subsystem returns at step 4 an authorization decision (e.g., yes, no, or yes with conditions) to the policy-based query generator. Additionally, the policy-based query generator receives the information map for the requested tables at step 5 from a query policy store as well as a list of data items from the end-user report generator at step 6 that have been selected for multiple tables.

The policy-based query generator returns at step 7 to the end-user report generator an SQL query that is augmented with row level security-motivated JOIN and WHERE items. The end-user report generator provides the SQL query to the relational data server at step 8. The relational data server then retrieves the requested information and provides the row level security-filtered data at step 9 to the end-user report generator for display as a report to the end-user at step 10.

It should be understood that similar to the other processing flows described herein, the steps and the order of the steps in the processing flow of this figure herein may be altered, modified, removed and/or augmented and still achieve the desired outcome. For example, the policy-based query generator may employ the following routine to generate the SQL statements used by the relational data server:

i) Determine a "starter set" of tables needed in the query based on the data items requested in the report.

ii) To create the FROM clause, connect all tables in the starter set by following the JOIN relationships defined in the Information Map. This can, in general, add more tables and also determines the particular type of SQL JOIN operation used for each connection. This full set of JOINs provides the FROM clause for the overall query.

iii) Add SQL WHERE clauses based on the filters that are selected in the report.

iv) Use SQL GROUP BY for summarization if requested by the report.

Furthermore, the policy-based query generator, can supplement this routine in the following ways:

i) Each "required table" (including those listed unconditionally in an information map and or those returned as a permission condition applicable to the current user) is added as a table to the "starter set".

ii) Any table in the starter set which has either an authorization-based prefilter or a general prefilter is replaced by an SQL Table subquery SELECTing that table and applying the filter as a WHERE clause.

iii) Should the prefilter reference a column of one or more other tables, the routine will recursively create a new starter set within the subquery, again building JOIN relationships as indicated by the information map. Typical use cases (as for a Star schema) do not require this.

iv) Identity-based property references (such as SAS.PersonName and SAS.ExternalIdentity shown in FIG. 8) are replaced by user-specific information determined from the authentication subsystem. These filters will most often be used as prefilters and thus will appear in the subquery generated at steps ii or iii.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. Moreover, although previous approaches may have been described herein with deficiencies, it is noted that the subject matter of one or more dependent claims have been included to address these deficiencies.

As another illustration of the wide scope, an approach described herein can be used separately or in combination with one or more of the other approaches described herein. For example, the following features can be used separately or in combination:

1) The definition of row-level security policy in the context of multi-table data models that are common in data warehousing today.

2) Declarative use of both WHERE-based and JOIN-based filtering in defining row-level security policies.

3) Declarative definition of filters which vary based on identity attributes derived from the authentication system.

4) The application of permission conditions in industry-standard access control technology to selectively enable these policies.

5) A graphical user interface for the definition of these policies in the context on a broader GUI-based query policy and guidance metadata definition tool (SAS Information Map Studio).

6) The transparent integration of these policy definitions with end-user query and reporting tools (such as the one described in U.S. Pat. No. 7,015,911, which is incorporated herein by reference).

As an illustration, a computer-implemented system can be implemented within a SAS Information Map Studio (which is available from the assignee of the invention) with the following features.

You can design and construct row-level filters by using a standard graphical user interface (GUI) within SAS Information Map Studio.

You can assign row-level filters to specific identities by using the standard authorization GUI for the SAS Intelligence Platform from within SAS Information Map Studio.

This feature is integrated with other SAS Intelligence Platform administrative functions. BI row-level permissions can be assigned to existing metadata identities, stored in the metadata repository, and evaluated by the SAS Metadata Server's authorization facility.

This feature is practical for use with large, dimensionally modeled data marts. BI row-level permissions can limit access to data within fact tables without incurring the performance cost of directly filtering those tables. This is accomplished by ensuring that access to a fact table is always subject to an inner join with a filtered dimension (the filtering criteria is usually some type of identity information).

This feature provides flexibility in several ways:

BI row-level permissions work with SAS data sets and third-party relational databases.

BI row-level permissions do not require a specific data model.

BI row-level permissions can be used with dynamically generated filters.

This enables you to make user-specific access distinctions without defining a separate filter for each person.

This feature enables you to define granular access to third-party data without requiring you to maintain individual user accounts within those database systems.

In the SAS system, note the following points if you want to use BI row-level permissions to implement row-level security:

While BI row-level permissions provide filtering whenever SAS data sets or third-party relational data are accessed through an information map, comprehensive security that incorporates this filtering requires a specific, high-security configuration of SAS Web Report Studio and appropriate coarse-grained operating system or DBMS protections.

Row-level permissions provide an additional refinement of control beyond setting permissions on libraries, tables, and columns. You use row-level permissions to define access to data at a more granular level, specifying who can access particular rows within a table. Row-level permissions are typically used to subset data by a user characteristic such as employee ID or organizational unit. For example, a table that contains patient medical information might be protected by row-level permissions that enable each doctor to see only those rows that contain data about that doctor's patients.

When row-level permissions are used, there are three possible authorization decision outcomes for a request to view data:

Grant The requesting user can access all rows.

Deny The requesting user cannot access any rows (and will get an error message).

Grant with conditions SQL filtering conditions

Unlike access controls for tables or columns, row-level permissions are based on filters and rely on target data that is modeled to work with those filters. The following topics describe filtering techniques for row-level permissions and explain how these controls limit the data that is displayed when a report is generated.

Filtering Methods for Row-Level Permissions

You define row-level permissions in filters that you assign to tables within an information map. For example, you can use a filter that compares values in a target table to a specified value. This enables you to implement a rule such as Joe can see his salary information. You can also use a filter that compares values in the target data to a value that is dynamically derived based on the identity of each requesting user. This enables you to implement a rule such as Each user can see his or her own salary information.

In order to use any filter for security purposes, you assign the filter as a prefilter. This prevents end users from disabling the filter and ensures that the filter is used to pre-screen the target data before any other criteria are applied. You can assign the filter in either of these ways:

Assign the filter as a general prefilter. The filter will be applied to every request and processed independently of any metadata layer access controls, serving as an additional layer of restriction. All users are subject to the filter, regardless of group membership or access controls that grant broader access.

Assign the filter as an authorization-based prefilter for one or more metadata identities. The filter will be evaluated by the authorization facility as a permission condition in coordination with other access controls, so group memberships and identity precedence can affect the outcome. For example, a filter that is assigned to the PUBLIC group can be overridden by an unconditional direct grant of Read permission that is assigned to a particular user.

The following table outlines the methods that you can use to set up filtering for security purposes. You can combine these approaches as needed to meet your business requirements.

| Row-Level Filtering Methods | | |
| --- | --- | --- |
| Filter Assignment Method | Filter Identity-Driven Is | Usage Descriptions |
| Authorization based prefilter | Yes | To make per-person (or per-identity) access distinctions for every member of a particular group, you can create a filter that uses an identity-driven property and assign that filter to a user group. The identity of each user in the group determines which rows the user can access. Users who are not members of the group are not subject to the filter. Because this is an authorization-based filter assignment, group memberships and identity precedence can affect the outcome. It makes sense to use this method when you want only some users to be subject to the filter, or you need to apply different filtering logic to different sets of users. |
| | No | To explicitly define different subsets for different identities, you can create a different filter for each subset and assign the filters to the appropriate users or groups. Because these are authorization-based filter assignments, group memberships and identity precedence can affect the outcome. This method can be useful for very simple subsetting or in combination with other methods. |
| General prefilter | Yes | To make per-person (or per-identity) access distinctions for all users, you can create a filter that uses an identity-driven property and assign that filter as a general prefilter. All users will be subject to the filter, regardless of group memberships or access controls that grant broader access. It makes sense to use this method when the same filtering logic is appropriate for all users. |
| | No | To explicitly define one subset of data for all users, you can create a regular filter and assign that filter as a general prefilter. All users will be subject to the filter, regardless of group memberships or access controls that grant broader access. This method is not useful for row-level security purposes, because it does not yield different results for different requesting users. This method is useful for creating one data subset for all users. |

Filters that Use Identity-Driven Properties

An identity-driven property is a user or group characteristic that is stored in the metadata and can be used in a filter as the value against which target data is compared. When an information map that includes this type of filter is executed, an identity-specific value is substituted into the filter expression to yield a filter that is appropriate for each requesting user.

The metadata server uses the user ID with which a client is authenticated as the basis for determining other characteristics about that client. For each connecting client, the metadata server can derive identity-specific values for the following properties:

SAS ExternalIdentity

An optional, site-specific value for the connecting client (such as employee ID). This property is often useful for filtering, because its values are likely to match user information that is already in the site's data. If more than one external identity value is associated with the connecting client, then the first of those values is returned. If there are no associated external identity values, then a NULL (MISSING) value is returned and an error message is displayed.

As with the other identity-driven properties, the values for the ExternalIdentity property must be in the metadata so that SAS Intelligent Query Services can dynamically determine the appropriate value for each connection. However, unlike the values for other identity-driven properties, the ExternalIdentity values are not automatically populated in the metadata. If you want to use this property, you must load and maintain values for this property in the metadata repository. During the identity bulk load process, ExternalIdentity values are extracted from an external enterprise identity source (such as Microsoft Active Directory Server or UNIX/etc/passwd files) and then imported into the SAS Metadata Repository. In this process, the association between each identity and the identity's value for ExternalIdentity is preserved.

SAS IdentityName

The name of the requesting user or group can be used, as displayed in the User Manager in SAS Management Console.

SAS PersonName

The name of the requesting user identity can be used, as displayed in the User Manager in SAS Management Console.

SAS Userid

The authenticated user ID of the connecting client, normalized to the uppercase format USERID or USERID@DOMAIN can be used.

The following table contains examples of filters that are based on identity properties, showing both the generic form and how each filter would be modified when executed by a user named Harry Highpoint. The example assumes that the customer has an employee information table named EmpInfo which includes Name, Category, WinID, and EmpID columns.

Examples of Filters That Use Identity-Driven Properties

How Row-Level Permissions are Incorporated When a Report is Generated

Figure 17:
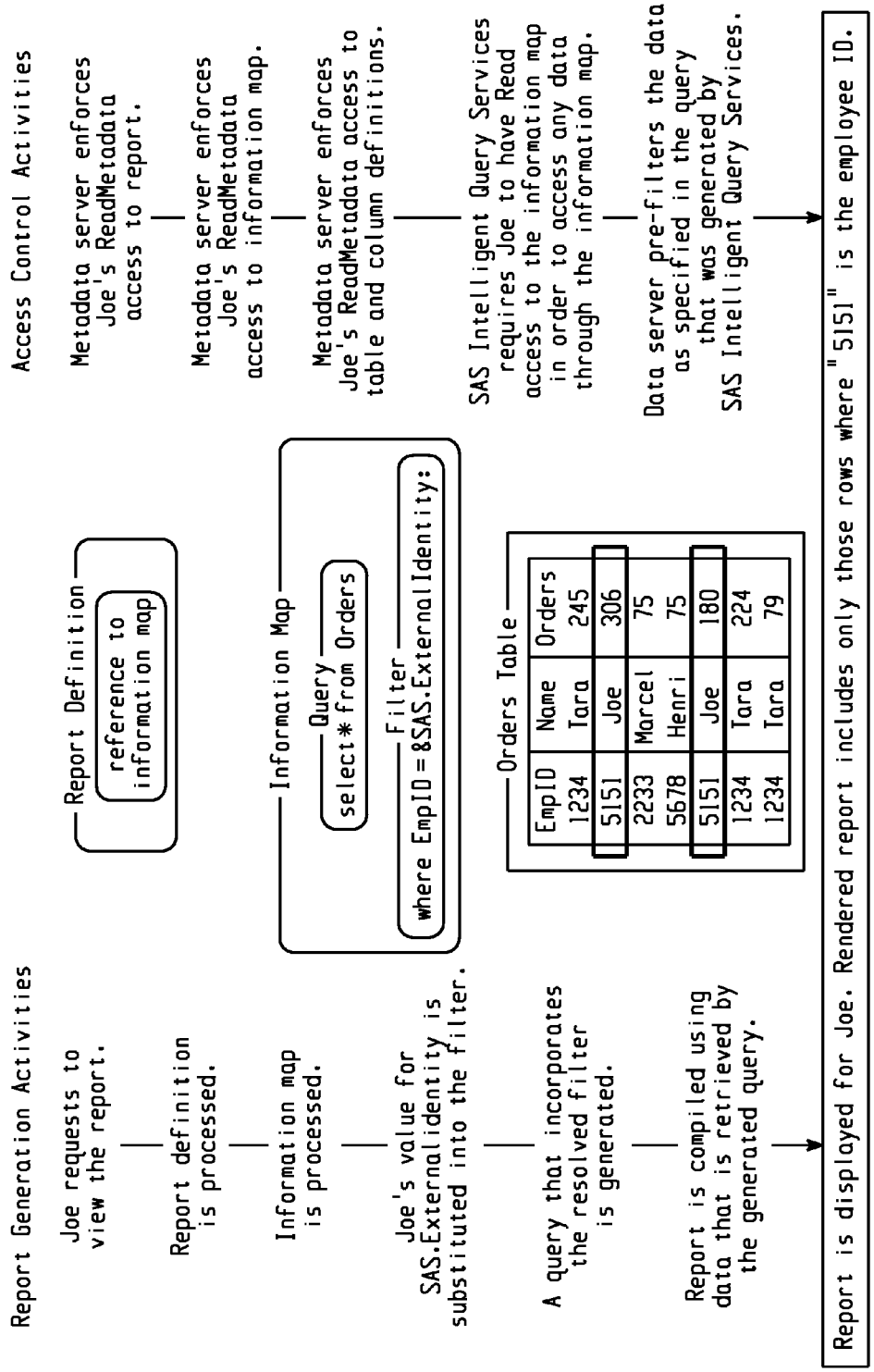
FIG. 17 is a block diagram depicting a report-generation process.

Row-level permissions are evaluated in coordination with controls for related resources (such as tables and columns) and controls in other authorization layers (such as physical access). Row-level permissions that are assigned to specific identities constrain only direct grants of the Read permission on information maps. FIG. 17 depicts at 1500 an example of how row-level permissions work. In the figure, a user requests access to a report that includes data for which row-level permissions have been defined by using an identity-driven property. For each step of the report-generation process, the figure depicts the access control activities in the metadata layer.

The overall flow is the same as for any other report: the report definition and underlying information map are processed, a query is generated to retrieve the data, and the report is displayed. These are the row-level security aspects of the process:

The information map includes a filter that is assigned to a particular metadata identity. This example uses an identity-driven property in a filter that is based on each group member's employee ID. The filter is assigned to a group to which Joe belongs. At runtime, SAS Intelligent Query Services uses information from the metadata repository to substitute Joe's employee ID into the filter. The resolved, user-specific form of the filter is incorporated into the generated query. The filter is used to screen the target table before the rest of the generated query runs.

The target data includes information that corresponds to the filter. In this example, the corresponding information consists of user-specific employee ID values in the EmpID column within the Orders table. The data server uses these values to filter the data as specified in the query that was generated by SAS Intelligent Query Services.

Precedence for Row-Level Permission Conditions

BI row-level filters that are assigned to specific metadata identities are evaluated by the authorization facility as permission conditions. The access control principles that are most relevant to row-level permission conditions are summarized in the following table:

| As Defined (Generic Form) | As Executed (Resolved Form) |
| --- | --- |
| Where EmpInfo.Name=&SAS.PersonName; | Where EmpInfo.Name="Harry Highpoint". |
| Where EmpInfo.Category=&SAS.IdentityGroupName; | An error message is returned because the user does not log on with a user ID that is stored as part of a group definition. |
| Where EmpInfo.Name=&SAS.IdentityName; | Where EmpInfo.Name="Harry Highpoint" |
| Where EmpInfo.WinID=&SAS.Userid; | Where EmpInfo.WinID="HIGH@WINNT" |
| Where EmpInfo.EmpID=&SAS.ExternalIdentity; | Where EmpInfo.EmpID="123-456-789" |

Access Control Principles for Row-Level Permission Conditions

| Principle | Example Scenario | Outcome and Explanation |
|---|---|---|
| A direct access control on an information map has precedence over access controls that come from the folder that contains the information map. | A direct access control on InformationMapA denies Read permission to PUBLIC. A direct access control on the folder that contains InformationMapA grants Read permission to a particular user. | The user cannot access data through InformationMapA. The denial to PUBLIC has precedence over the grant to the user because the denial is assigned directly on the target resource (InformationMapA). Direct access controls always have precedence over inherited controls regardless of who the permissions are assigned to. |
| In order to assign a row-level permission filter to an identity, the identity (or a group to which the identity belongs) must have a direct grant of Read permission on the information map. | The only access control on InformationMapA is an inherited grant of Read permission to PUBLIC. | You cannot define row-level permissions for InformationMapA. The identity (or a group to which the identity belongs) must be added to the Authorization tab for Information MapA and directly granted Read permission. In the Authorization tab, a direct grant has a white background. |
| If there are multiple row-level filters that apply to a user because of the user's group memberships, then the highest precedence identity controls the outcome. | A filter on InformationMapA limits Read permission for GroupA. Another filter on InformationMapA limits Read permission for the SASUSERS group. The user is a member of both GroupA and SASUSERS. | The user can see only the rows that GroupA is permitted to see. GroupA has higher identity precedence than SASUSERS, so the filters that are assigned to GroupA define the user's access. |
| If there are multiple row-level controls at the same identity level, then the outcome is the superset of rows that are allowed by either filter. | A filter on InformationMapA limits Read permission for GroupA. Another filter on InformationMapA limits Read permission for the GroupB. The user is a first level member of both GroupA and GroupB. | The user can see any row that is permitted for either GroupA or GroupB. |

Example: Precedence for Row-Level Permission Conditions

This example describes the impact of identity precedence when a manager uses an information map that includes both of the following filters for a SALARY table:

A row-level filter assigned to the SASUSERS group gives each user access to his or her own salary information.

A row-level filter assigned to a Managers group enables each manager to see the salaries of the employees that he or she manages.

When the manager accesses the SALARY table through this information map, the filter that is assigned to the Managers group is applied, and the filter that is assigned to SASUSERS is ignored. This is because the manager's direct membership in the Managers group has higher identity precedence than the manager's implicit membership in the SASUSERS group. To avoid a situation in which managers can see their employees' salaries but each manager cannot see his or her own salary, you can use either of these approaches:

Assign the filters to two groups that have the same identity precedence. For example, if you assign the first filter to a general purpose user-defined group (rather than to SASUSERS), and you make each manager a direct member of that group, then managers will have an identity precedence tie between that group and the Managers group. This situation causes the two filters to be combined for members of the Managers group, enabling those users to see any row that is permitted by either filter.

Define the Managers filter in a way that encompasses all of the rows that the managers should be able to see.

How to Create a Secure Environment for BI Row-Level Permissions

Overview of Requirements

Figure 18:
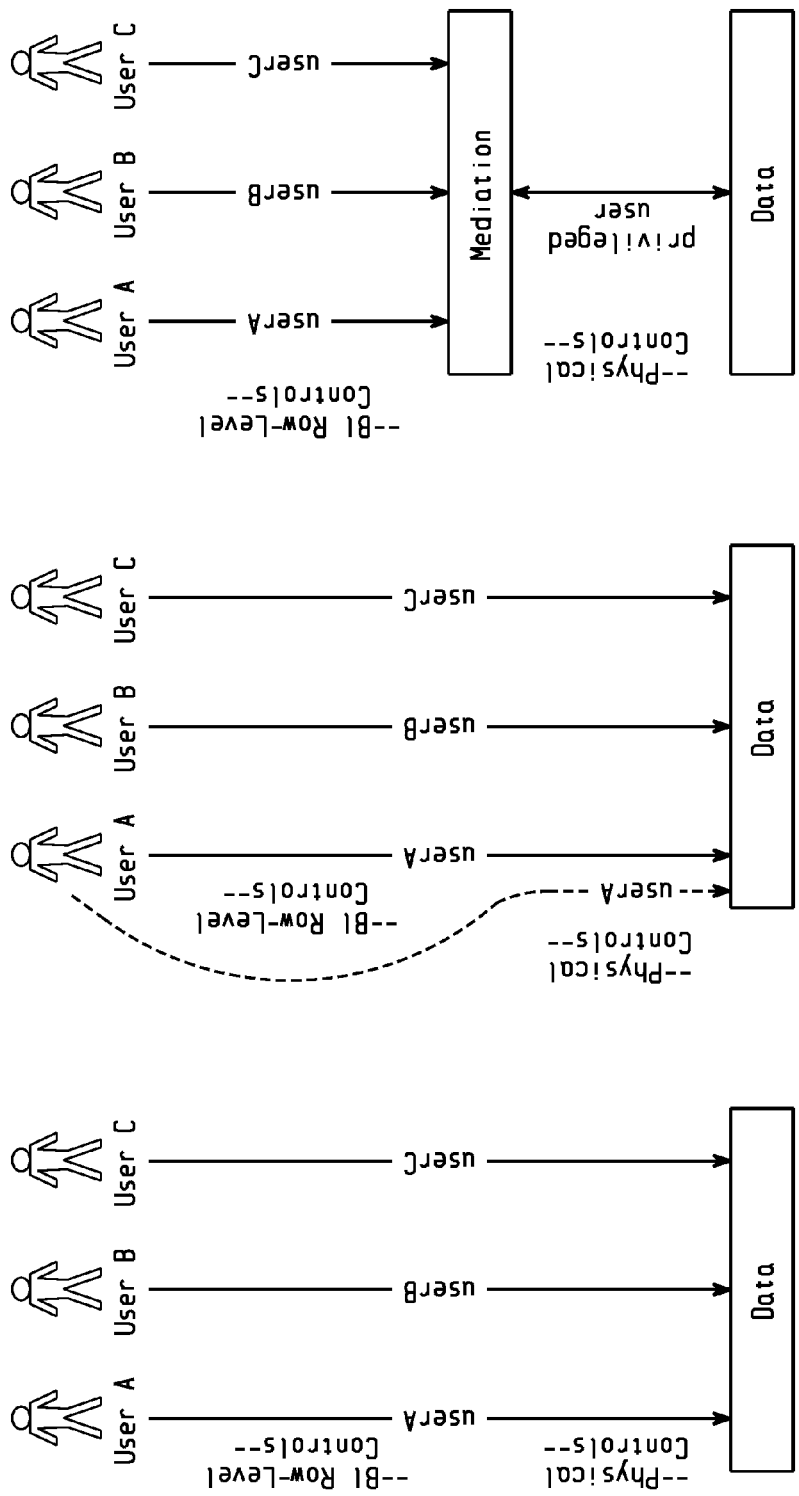
FIG. 18 is a block diagram depicting a secure environment.

Like any other security feature, row-level security requires that you pay careful attention to the entire environment in order to avoid vulnerabilities in other security layers. For example, if you do not limit physical access to the target data, there is a risk that users will exploit their physical access to circumvent the row-level filters that you create. If this is an acceptable risk, then no special measures are needed. For example, this can be an acceptable risk in these types of environments:

prototype environments environments in which a firewall segregates untrusted users environments in which untrusted users do not have the tools, knowledge, or OS privileges to access files and metadata on the server tier environments that for other reasons do not have strict security requirements If, on the other hand, you require strict security controls against the possibility of malicious activity on your company intranet, then a more tightly protected configuration is necessary. In such circumstances, it is important to strictly limit physical access to the target tables to prevent direct access by regular users. The goal is to enable regular users to have only mediated access to the target tables. The strategy is to ensure that participating applications use a privileged account to fetch data for requesting users, and to deny regular users physical access to the tables. FIG. 18 illustrates these points at 1600 as well as provides instructions for setting up the recommended environment. The mediation that is depicted in the figure is provided by a pooled workspace server that is dedicated for use with SAS Web Report Studio for these reasons:

Using a pooled workspace server prevents the workspace server processes from running under the accounts of requesting users. Pooled workspace servers run under one or more designated accounts that are called puddle accounts.

Using a dedicated workspace server isolates the puddle account from applications that do not fully enforce row-level security. The pool administrator account is identified in a configuration file that is used only by SAS Web Report Studio, so workspace servers that are launched from other applications cannot use the pool.

To ensure the tightest possible security, follow these instructions.

1 Verify that the basic protections are used.
2 Create a new pooled workspace server for exclusive use by SAS Web Report Studio.
3 Ensure that the puddle account for the restricted workspace server can physically access the target data and that regular users cannot. Regular users are people who should be able to access the data only from SAS Web Report Studio.
   For SAS data sets, give read access to the puddle account in the operating system layer.
   For third-party database tables, give read access to the data to a privileged database account. (In a later step you will make the credentials for this privileged database account available to the puddle account).
   Note: Some members of your staff will also need physical access to the data. For example, the person who creates an information map based on the target data must have physical access to the data.
4 For target data that is in third-party databases, assign libraries by using the METAAUTOINIT method of library pre-assignment. This method causes the libraries to be assigned to the metadata identity for the puddle account.
   Note: When you pre-assign a library using the METAAUTOINIT method, authorization decisions are based on the metadata identity under which the workspace server connects to the metadata server. Workspace servers that use the METAPERSON option connect under the identity that is specified by that option. Other workspace servers connect under the identity of the puddle account (pooled workspace servers) or the identity of the connecting client (standard workspace servers). These statements assume that workspace servers that do not use the METAPERSON option connect to a metadata server that uses the TRUSTSASPEER option, which is the default configuration.
   To use the METAAUTOINIT method to assign libraries, complete these steps:
      a In SAS Management Console, navigate to the restricted workspace server and select Properties and Options.
      b In the Object Server Parameters field, enter METAAUTOINIT. This tells the workspace server to connect to the metadata server to obtain information about library assignments.
      Note: The workspace server connects using the account that it is running under (the puddle account). The metadata server determines that the metadata identity for the puddle account is the Restricted Puddle Access group (because you stored the puddle account user ID in a login on this group definition). This causes the libraries to be assigned to the Restricted Puddle Access group.
      c Stop and then restart the object spawner to make this change take effect.
   With this method, the restricted workspace server can set up and use a target DBMS library, while attempts to assign the library under another metadata identity will fail. For example, a regular workspace server that is launched by Tara O'Toole while using SAS Enterprise Guide cannot successfully assign the DBMS library, because the workspace server's metadata identity (Tara O'Toole) does not have physical access to the library.
5 For target data that is in third-party databases, set up credentials in the metadata to enable the puddle account to access those servers. You can make credentials for a database server available to the puddle account by storing those credentials in a login as part of the Restricted Puddle Access group definition. For example, to enable the puddle account to access a DB2 server, you would give the Restricted Puddle Access group a login that includes a DB2 user ID and password and that is associated with the DB2 server's authentication domain.
   Note: As explained in step 3, some members of your staff will also need to be able to authenticate to the database server.

How to Implement Row-Level Permissions in the SAS Example

Process Overview for Implementing Row-Level Permissions

The process for setting up row-level permissions includes these phases:

1 Review and summarize what you want to accomplish by defining row-level permissions.
2 Determine how you can combine row-level permissions with other metadata layer and physical controls to meet your business requirements.
3 Structure the target data to fit with the subsetting that you want to do.
4 Create filters that implement the row-level access rules that you have identified and that work with your data.
5 Test the row-level controls to verify that they function as intended.

The following topics describe these phases, using simple, abbreviated examples to explain specific points.

Business Requirements Phase

Business requirements often dictate that different users should see different portions, or slices, of data. In some cases, the requirement is driven by the sensitive nature of data. For example, company policy might state that each sales person should be able to access only his or her own salary information. In other cases, the requirement is intended to prevent information overload. For example, each regional sales team within a national organization might be interested in only the sales trend information for their region. Row-level access distinctions are frequently based on each user's place in an organizational structure such as a management hierarchy or a product matrix. The visibility of data can depend on a simple, site-specific condition such as a user's security clearance level, or on a more complex condition that consists of multiple filters.

In many cases, there are coarser-grained (table-level) business requirements that accompany the row-level access rules. For example, business requirements often dictate that some users (such as executives or system administrators) should be able to access all rows in a target table, while some users (such as users who do not have individual metadata identities) should not be able to access any rows.

Planning Phase

Planning for row-level security can include these steps.

1 If your site has strict security requirements, you must perform additional deployment configuration steps to create an appropriate environment.

2 Set coarse-grained controls as described in the following table.

| Coarse-Grained Controls | | | |
|---|---|---|---|
| Business User | Metadata Layer | | Physical Layer |
| Access Class | Target Table | Information Map | Target Table |
| All rows | Grant R, RM | Grant R, RM | Deny[1] |
| No rows | Deny R, RM | Grant[2] R, RM | Deny |
| Some rows | Grant R, RM | Grant R[3], RM | Deny[1] |

[1]In a high-security environment, regular users should not have physical access to the data. In other circumstances, regular users might have physical access to the data.
[2]Grant these permissions if the "No rows" users need to access other tables through this information map.
[3]For filters that are assigned as authorization-based prefilters, this must be a direct grant of Read permission on the information map. This access will be constrained by the row-level conditions that you define in the next step.

3 Decide how you will create the data subsets that will narrow the direct grant of Read permission as appropriate for each user.

If you want to make per-person access distinctions for the members of a particular user group, select an identity-driven property to use as the basis for an authorization-based prefilter that you will assign to that user group. For example, to give each user access to a distinct set of rows based on the user's metadata identity, you might plan to create a filter that uses the SAS Userid property and to assign that filter to the PUBLIC group.

If you want to make a relatively small number of access distinctions, each of which will apply to one or more metadata user or group identities, design a separate filter for each class of access and plan to assign each filter to the appropriate identities. For example, to create low-, medium-, and high-security subsets of data, you might design three filters and plan to assign each of those filters to a different metadata user group.

For more complex business requirements, you can use combinations of the different filtering techniques.

Your choice of filtering methods will be affected by the number and type of access distinctions that you are making, the information that your data already contains, and your plans for enhancing your existing data to support row-level filtering. When you are composing the filtering logic that you will use to meet your business requirements, consider these guidelines:

For manageability, limit the total number of filters that you define. Many common business requirements can be met by using a filter that is based on an identity-driven property. There is significantly less maintenance involved in this approach than in explicitly defining a different filter for each user.

For manageability, try to assign filters that you create to user groups rather than to individual users. In order to assign a filter to a user group, that user group must be defined in the metadata. Familiarity with the user group structure in your metadata will help you efficiently define row-level controls.

For simplicity, avoid situations in which multiple filters apply to a particular user as a result of the user's group memberships. In such situations, the subset of data that is available to that user is determined by identity precedence.

Data Modeling Phase

Overview of the Data Modeling Phase

Row-level permissions require that the target data support the subsetting that you will use to meet your business requirements. In many cases, you must modify an existing data model to include information that corresponds to the filters that you will use. As a simple example, consider a company that consists of a four-person, flat organizational structure and has a business requirement that each employee should see only his or her own order information. The order information is stored in a table depicted at 1700 in FIG. 19.

You supplement this existing data model to support and fit the filtering that you want to do. For this example, assume that the choice of filtering method is affected by these points:

You do not want to manage a different filter for each user.

You manually created your metadata identities, so you do not have SAS ExternalIdentity values in the metadata that correspond the EmpID values in the ORDERS table.

In these circumstances, you will need to enhance the data to support filtering based on another identity-driven property such as SAS PersonName. To support this subsetting, you would create an employee information table that includes a PersonName column (or add a PersonName column to an existing employee information table). In each row, you would enter a value that corresponds to the employee's name on the General tab of his or her user definition in SAS Management Console (because this is the SAS PersonName value for the employee). A minimal version of the table that is needed looks like the table shown at 1800 in FIG. 20.

Figure 21:
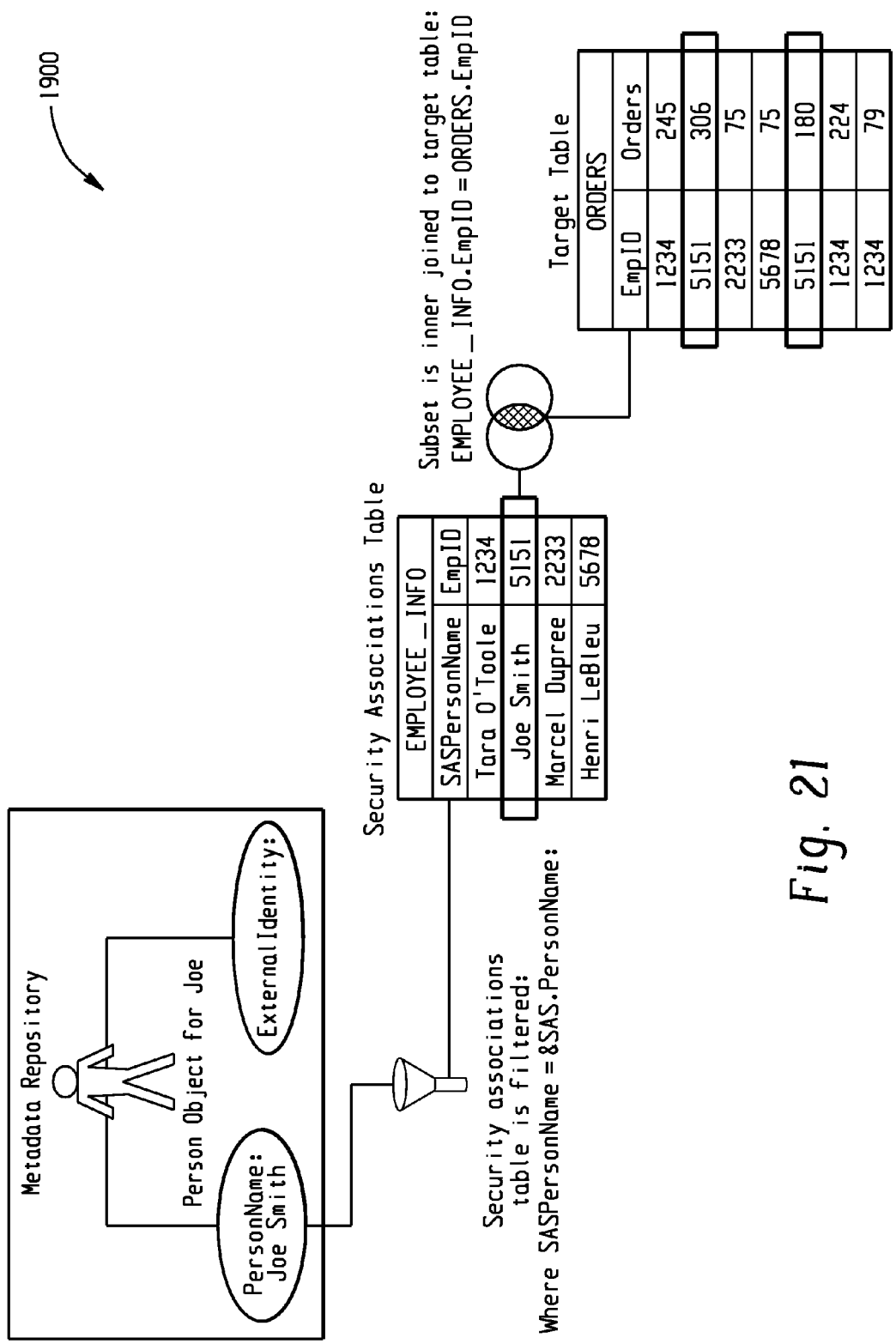
FIGS. 21 and 22 depict an example of how a security associations table can be used.

When an end user submits a query, the information map that provides access to the ORDERS table uses the employee information table to pre-screen the data. The employee information table is filtered based on each requesting user's identity and then inner joined to the ORDERS table (on the EmpID column). FIG. 21 depicts at 1900 this process of how in the orders example the security associations table is used.

Figure 22:
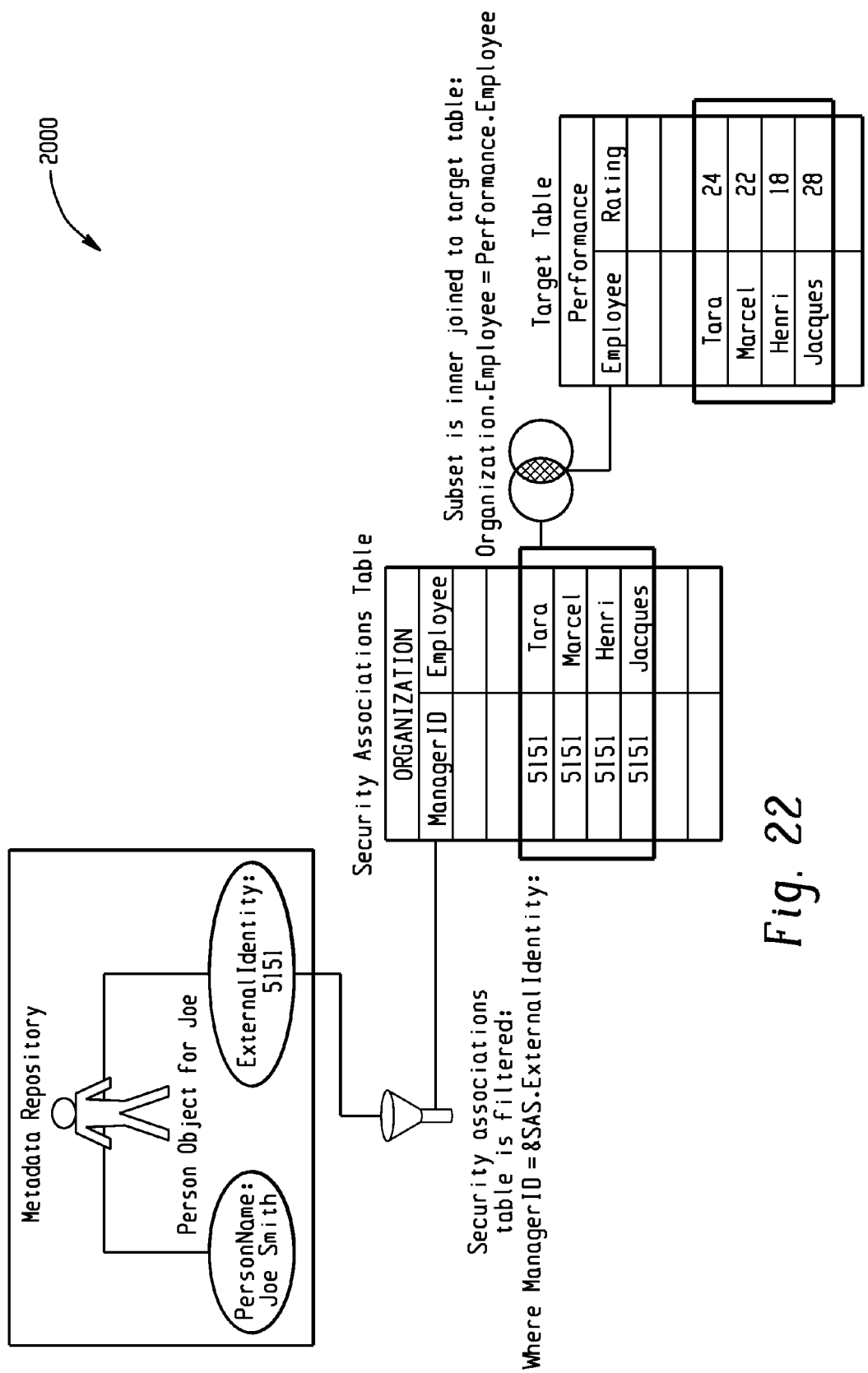

As another example, consider a company that has a business requirement that each manager can see performance rating information for his or her direct reports. As in the previous example, you supplement the existing data to support and fit the filtering that you want to do. For this example, assume that the SAS ExternalIdentity information is available in the metadata and that you choose to base your filtering on this identity-driven property. FIG. 22 depicts at 2000 a data model that supports subsetting based on each manager's value for the ExternalIdentity property.

The purpose of these examples is to illustrate the approach of managing security associations in a separate table and to illustrate how that table is used. In most cases, the volume of data is larger and the business requirements are more complex. For example, the security associations table in the performance rating example does not enable a manager to see his or her own rating. These differences can result in additional considerations for the security associations table. The following topics address some of those considerations.

Content of a Security Associations Table

A security associations table is a type of table that documents the relationships between a user and some criterion on which you are making access distinctions. When access distinctions are based on each user's place within an organizational hierarchy, the security associations table must contain a representation of the reporting relationships within the organization. If access distinctions are based on some other criterion (such as each user's project assignments), then the security associations table should reflect that criterion.

Note: In the preceding examples, the security associations tables are the EMPLOYEE_INFO table (in the orders example) and Organization table (in the performance rating example).

Format of a Security Associations Table

BI row-level permissions do not require that the security associations table have a particular format. However, the format of a security associations table can affect filter performance. This topic describes a format that supports efficient hierarchy-based filtering. This format is useful for many common scenarios, because security policies are often hierarchical. For example, a typical business requirement is that a manager can see data for all of the employees that he or she manages either directly or indirectly.

Figure 23:
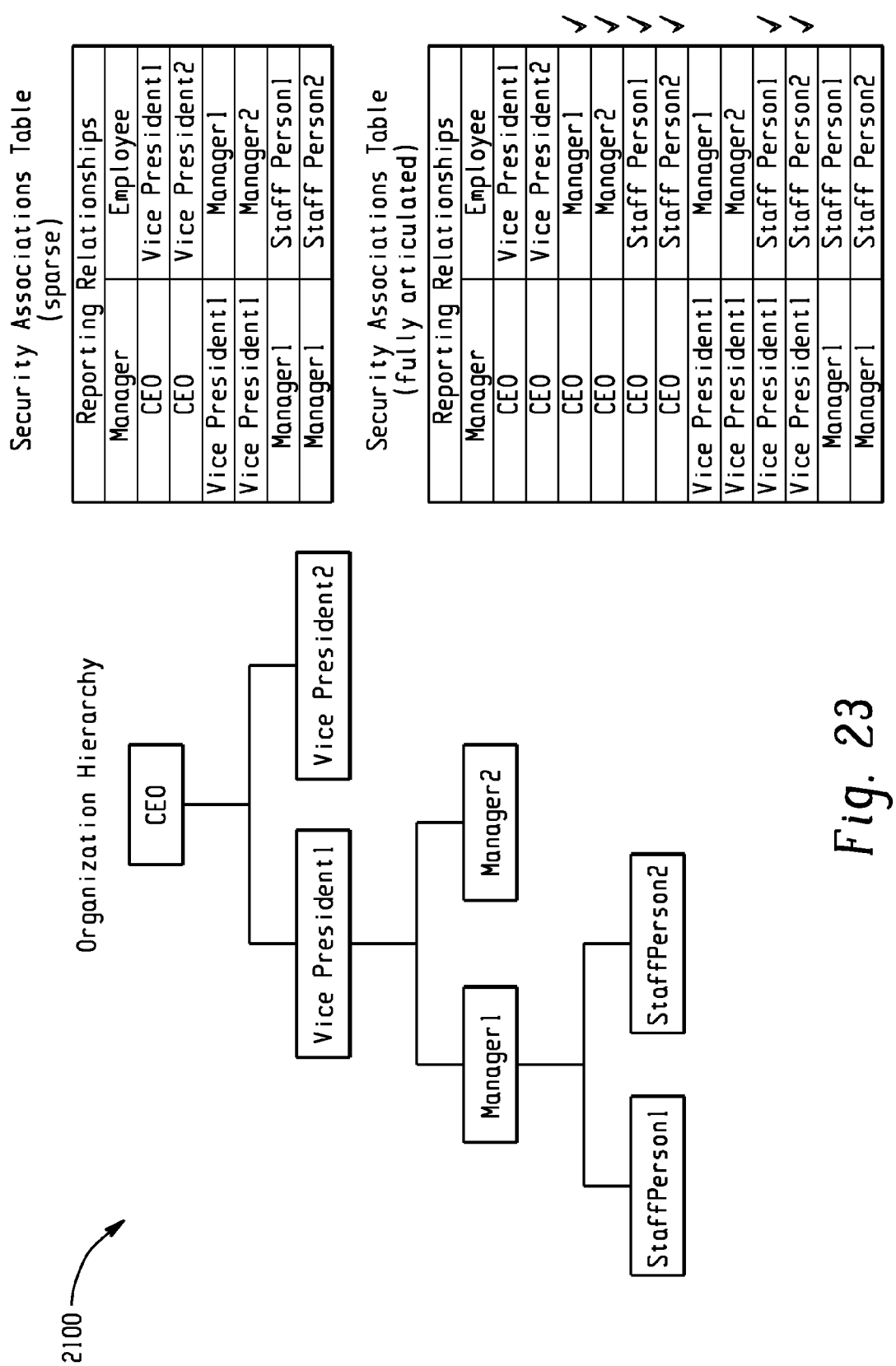
FIG. 23 provides an example representation of an organizational hierarchy.

FIG. 23 depicts at 2100 several ways to structure a security associations table that documents each user's place in a simple organizational hierarchy. The sparse version of the table includes only direct reporting relationships; information about indirect relationships must be derived. The fully articulated (or robust) version explicitly includes indirect reporting relationships along with direct reporting relationships; this is advantageous for query performance.

The table that uses the fully articulated format explicitly includes not only the hierarchy's immediate parent-child relationships, but also every other ancestor-descendant association (such as grandparent-child and greatgrandparent-child). This facilitates simpler queries by eliminating the need to traverse the hierarchy to find all of the descendants of any particular node.

Creation and Maintenance of a Security Associations Table.

This topic contains a discussion about creating and managing a security association table for use with dimensional target data. BI row-level security does not require that target data adhere to a particular structure. This description is for dimensional data, because that is a frequently used structure for query and reporting.

A security associations table is usually created as a new object by traversing an existing sparse table and filling in the indirect relationships to create a fully articulated (or robust) version of the table. If you do not have an existing sparse table, then you must create that object first.

Note: If you want to enhance an existing sparse table rather than creating a new table, you should first review current uses of the sparse table to determine whether the additional rows will negatively affect those uses.

In most cases it will be helpful to have an index on the column in the security associations table that is used for filtering. In some cases, factors such as the size of the security associations table or query optimization features in a particular data source might negate the need for this index.

The security associations table must be maintained as security relationships change. This maintenance should be on a schedule that is appropriate for your environment. Typically, this maintenance is accomplished by a batch process (such as a nightly ETL process against the existing tables). In some cases, updates might be entered directly by an administrator.

Information Map Design Phase

Overview of the Information Map Design Phase

Figure 24:
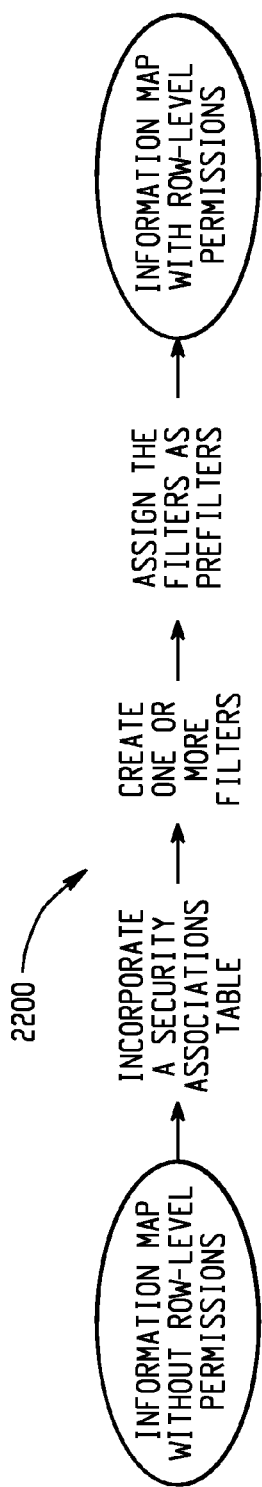
FIG. 24 illustrates an information map design for row-level permissions.

FIG. 24 depicts at 2200 row-level permission aspects of information map design. The following provide generic instructions for each of the four tasks shown in the figure.

How to Add a Security Associations Table to an Information Map

In order to make the security relationship information that you added to the data model available for filtering, you incorporate that information in an information map. For example, to enhance an existing information map to include a new security associations table, you would perform these steps:

1 Register the new security associations table in the metadata.
2 In SAS Information Map Studio, open an information map and then select Insert and then Table.
3 In the Insert Table dialog box, select the table that you are using as a security associations table, and then click OK.
4 On the Relationships tab in the application's main window, create the connections between the table that you are using as a security associations table and other tables in the model. This procedure typically involves defining an inner join to connect an identifier column in the security associations table with a corresponding column in the target table (or in an intermediate dimension).
5 Make the security associations table a required table by performing these steps:
  a Select Edit ▶Properties ▶Information Map, and then select the Required Tables tab in the Information Map Properties dialog box.
  b In the Available tables list, select the table that you are using as a security associations table.
  c Use the arrow button to move the table to the Required tables list.
  d Click OK.

Note: We recommend that you do not add data items from a security associations table to an information map. Excluding these items from the information map prevents these items from surfacing when reports are created in SAS Web Report Studio.

How to Create a Filter for Row-Level Permissions

Filters that are based on identity-driven properties can be very useful for row-level security purposes. To create a filter that is based on an identity-driven property, perform these steps in SAS Information Map Studio:

1 Open the information map and then select Insert ▶Filter to open the New Filter dialog box.
2 Enter a name and description for the filter, and then click Edit Data Item.
  Note: In these instructions, the filter uses a physical column rather than one of the business data items that are listed in the Data item drop-down list. For row-level security, we recommend that filters use physical columns, because this prevents the filters from surfacing when reports are created in SAS Web Report Studio.
3 In the Edit Expression dialog box, select a physical column (from the table that you are using as a security associations table), and then click OK.
4 In the New Filter dialog box, the fields in the Values section are now available. From the Enter value(s) drop-down list, select Derive Identity Values. A table of identity-driven properties becomes available.
5 In the table of properties, select the row for the identity-driven property that you want to use in the filter.

6 Click OK. The new filter is now available for use in the current information map.

You can use a wide variety of filters for row-level security purposes.

How to Assign a Filter for Row-Level Permissions

In order to be used for security purposes, a filter must be assigned as either an authorization-based prefilter or a general prefilter.

To assign a filter as an authorization-based prefilter, perform these steps in SAS Information Map Studio:
1. Open the information map and then select Tools ▶Authorization to open the Authorization dialog box.
2. In the Names box, select an identity to which you will assign the filter, or click Add to add an identity to the Names box.
3. If Read permission is not directly granted to the selected identity, add a direct grant by selecting the Grant check box. In the Permissions list, a white background color behind a selected check box indicates that the permission is directly assigned.
4. Click Add Condition (or Edit Condition) to open the Row-Level Permission Condition dialog box.
5. In the Selected filters list, select the table that you are using as a security associations table.
6. In the Available filters list, select the filter and then use the arrow button to move the filter to the Selected filters list.
7. Click OK to apply the filter assignment and close the Row-Level Permission Condition dialog box.
8. In the Authorization dialog box, click Close.
9. To make your changes take effect, save the information map.

To assign a filter as a general prefilter, perform these steps in SAS Information Map Studio:
1. Open the information map and then select Edit ▶Properties ▶Information Map.
2. In the Information Map Properties dialog box, select the General Prefilters tab.
3. In the Selected filters list, select the table that you are using as a security associations table.
4. In the Available filters list, select the filter and then use the arrow button to move the filter to the Selected filters list.
5. In the Information Map Properties dialog box, click OK to apply the filter assignment.

Verification Phase

Testing should be performed from an application such as SAS Web Report Studio. This testing requires that you log on to that application using different accounts.

Note: For users who have physical access to the data, you can do some preliminary testing to check your filter logic from within SAS Information Map Studio. Before you test an information map from within SAS Information Map Studio, you should save the information map to ensure that all settings are applied. To test a filter that is based on an identity-driven property, use different accounts to log on to SAS Information Map Studio. To test other filters, temporarily assign the filters to your identity.

Example: Using Row-Level Permissions

Introduction, Assumptions, and Data Model

The following example demonstrates how a company could use row-level permissions to manage access to employee data. The example is based on the following assumptions:
The company is running SAS Information Map Studio 3.1, SAS Web Report Studio 3.1, and the SAS Intelligence Platform 9.1.3 with Service Pack 4.
The target tables are registered in the metadata repository.
Except where otherwise noted, users have Read permission for the information maps that they are using.
Except where otherwise noted, the company has constrained physical access to target data, and has set appropriate protections for the target library and tables.

The data model for the example is a star schema that contains employee and customer data for a fictional sporting goods company. To support efficient row-level filtering, the security associations table includes both direct and indirect reporting relationships.

Note: This example uses a classic star schema design because this is a common data structure for query and reporting purposes. BI row-level permissions do not require that you use a particular data structure.

Implementation Process

Figure 25:
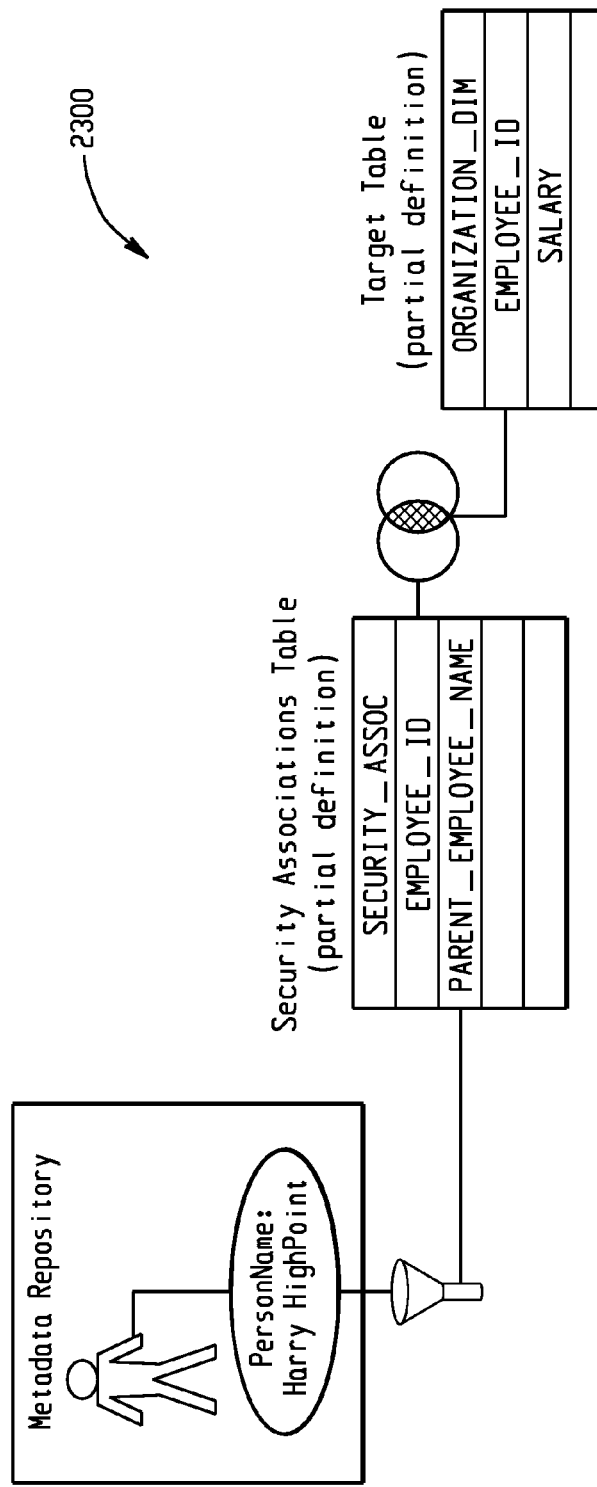
FIG. 25 depicts salary filtering with a SAS.PersonName property.
Figure 26:
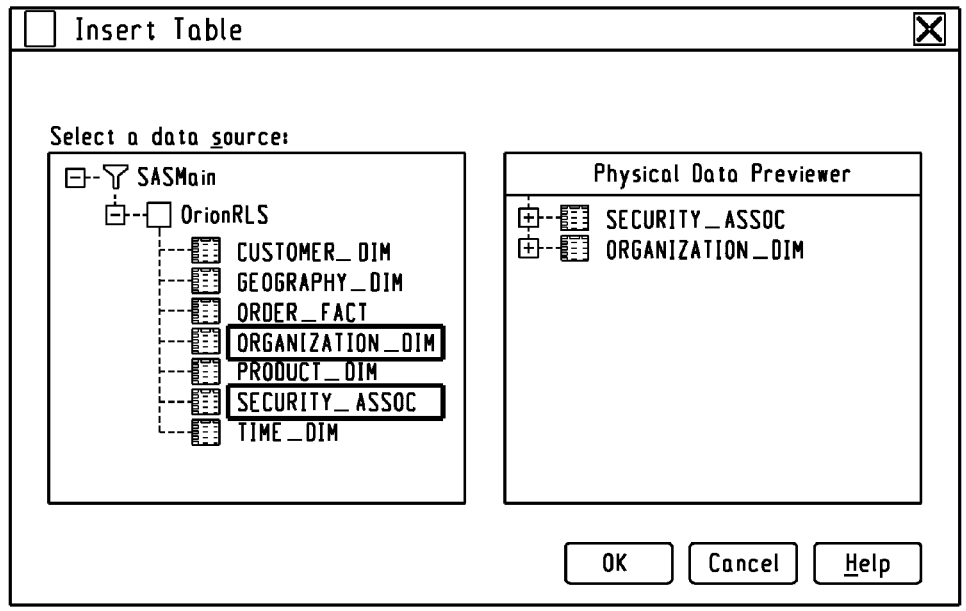
Figure 27:
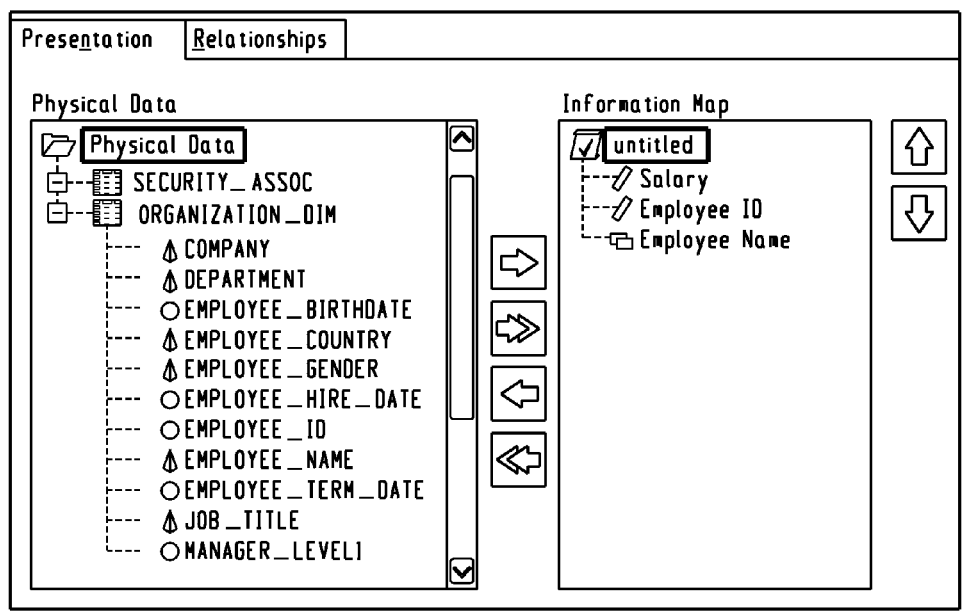
Figure 28:
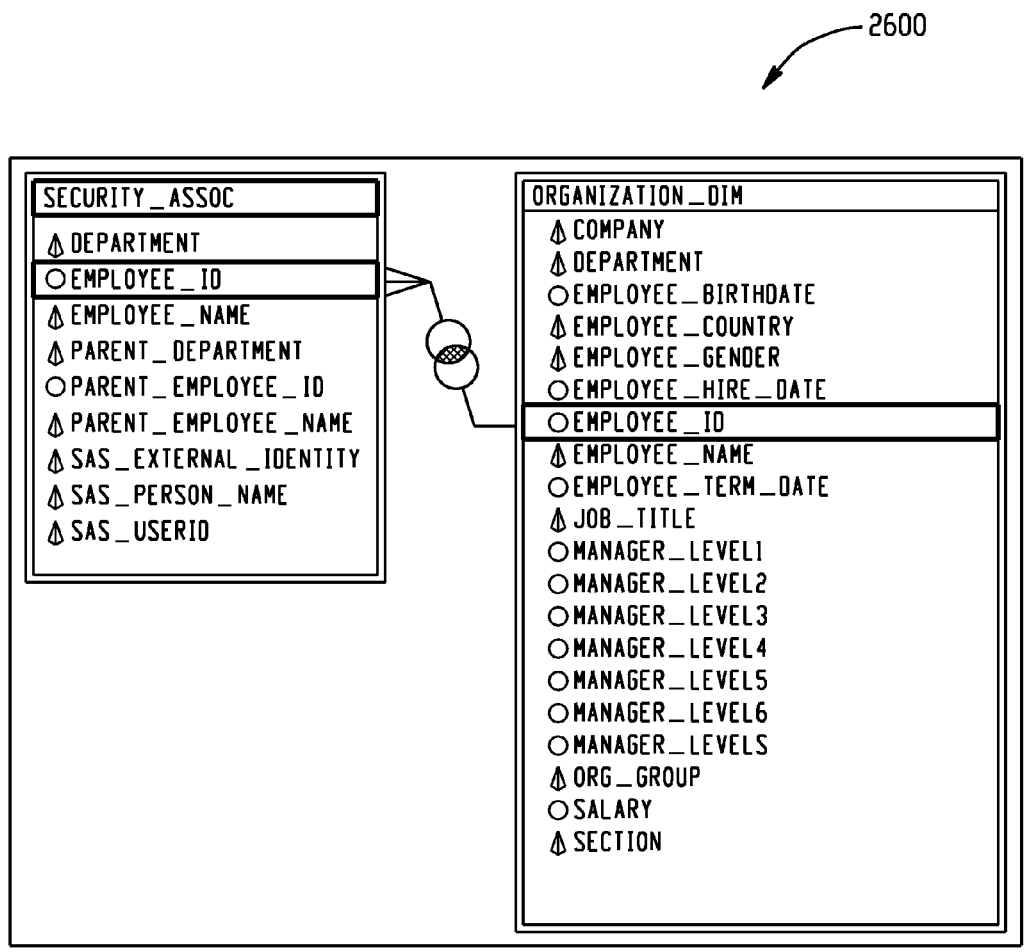
Figure 29:
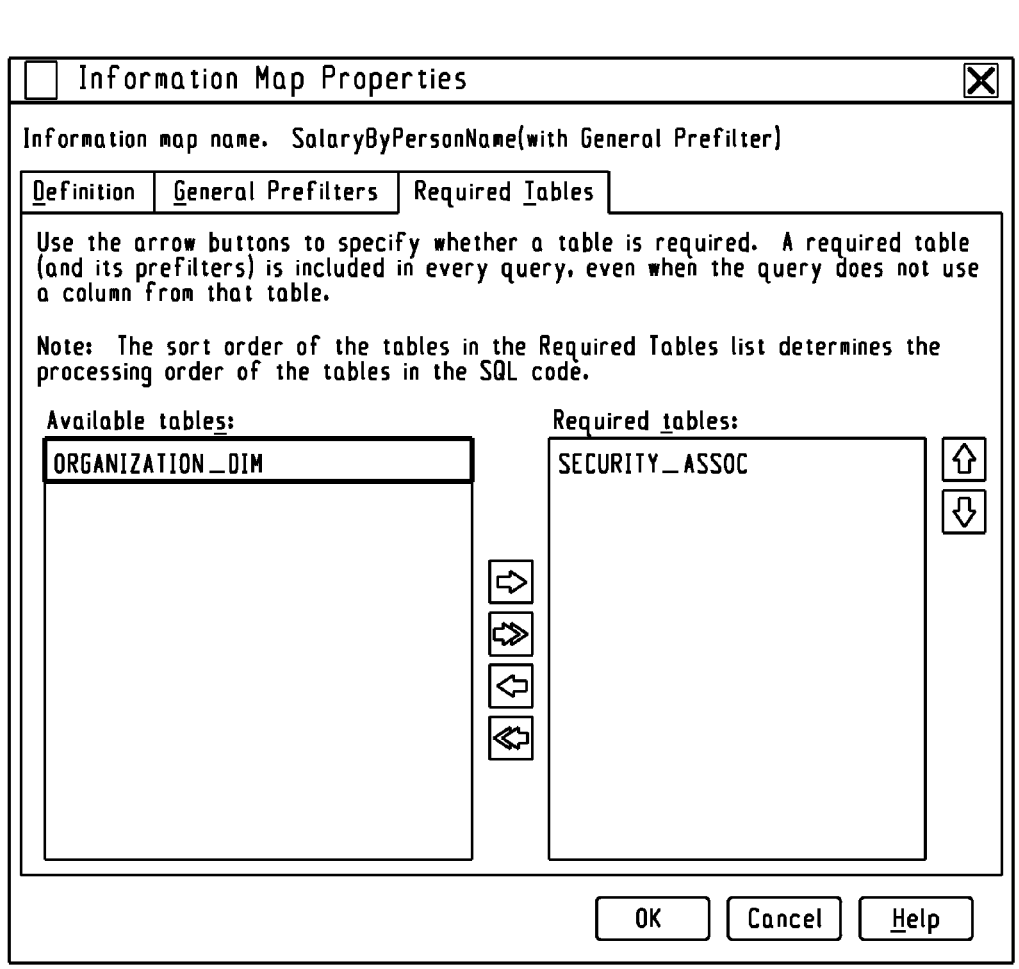

In this example, the business requirement is to enable managers to see salary information for their employees. One way to meet this requirement is to use the SAS PersonName property. The SAS PersonName of each requesting user is used to filter the security associations table, based on corresponding values in the PARENT_EMPLOYEE_NAME column. This yields a subset of rows that includes all employees who report (directly or indirectly) to the requesting user. That subset of rows is then inner joined to the table that contains salary information, so that only the salaries of employees who report to the requesting user are returned. FIG. 25 depicts at 2300 this process for a requesting user who is a high-level manager in the organization. The SAS PersonName value for this requesting user is "Harry Highpoint". To set up these row-level permissions, complete these information map design tasks:
1. Create an information map that includes the salary information, security associations information, and necessary relationships.
   a. In SAS Information Map Studio, select File ▶New to open a new information map.
   b. Select Insert ▶Table to open the Insert Table dialog box, and then navigate to the library that contains the target data. In this example, the library is named OrionRLS. Select the table that contains a representation of reporting relationships (SECURITY_ASSOC) and the table that contains salary information (ORGANIZATION_DIM) and then click the OK button on GUI 2400 in FIG. 26.
   c. In the main application window, on the Presentation tab, add the data items that you will need from each table:
     It is a good practice to not add any data items from the SECURITY_ASSOC table. You will use the PARENT_EMPLOYEE_NAME column when you create a filter, but you will use the physical item for this purpose.
     From the ORGANIZATION_DIM table, insert the SALARY, EMPLOYEE_ID, and EMPLOYEE_NAME columns as shown at 2500 in FIG. 27.
   d. On the Relationships tab, join the two tables on EMPLOYEE_ID as shown at 2600 in FIG. 28.
   e. Select File ▶Save, navigate to an appropriate folder, give the new information map a name such as SalaryByPersonName(withGeneralPrefilter), and click Save.
   f. To make the SECURITY_ASSOC table a required table, perform these steps:
     i. Select Edit ▶Properties ▶Information Map.
     ii. In the Information Map Properties dialog box, select the Required Tables tab.

iii In the Available tables list, select the SECURITY_ASSOC table.

iv Use the arrow button to move the table to the Required tables list, and then click the OK button shown on GUI 2700 in FIG. 29.

2 Create a filter that subsets data by comparing each requesting user's SAS PersonName value to the PARENT_EMPLOYEE_NAME values in the security associations table.

a Select Insert ▶Filter to open the New Filter dialog box. If this menu selection is not available, you do not have Read access for the new information map. To grant the Read permission for this information map, select Tools ▶Authorization.

b Enter a name such as byPersonName for the filter, and then click Edit Data Item.

c In the Edit Expression dialog box, select Character from the Type drop-down list. On the Data Sources tab, navigate to Physical Data ▶SECURITY_ASSOC ▶PARENT_EMPLOYEE_NAME, and then click Add to Expression.

Figure 30:
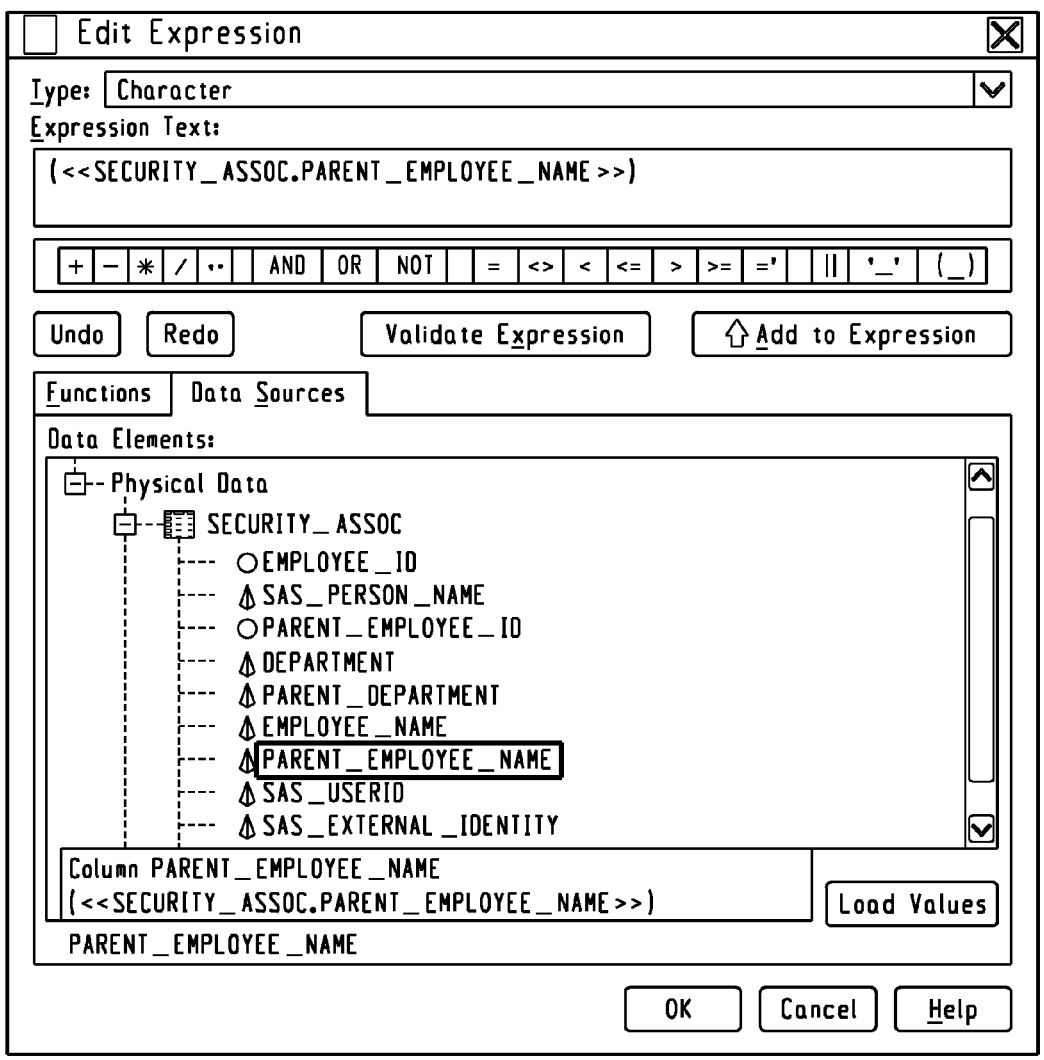

Note: A physical column is used because this prevents the filter from surfacing when reports are created in SAS Web Report Studio.

d Click Validate Expression on GUI 2800 of FIG. 30, and then click OK twice.

e In the New Filter dialog box, from the Enter value(s) drop-down list, select Derive Identity Values. A table of identity-driven properties becomes available.

f In the table of properties, select the SAS.PersonName row on GUI 2900 of FIG. 31.

g Click OK. The byPersonName filter is now available for use in the information map.

Figure 32:
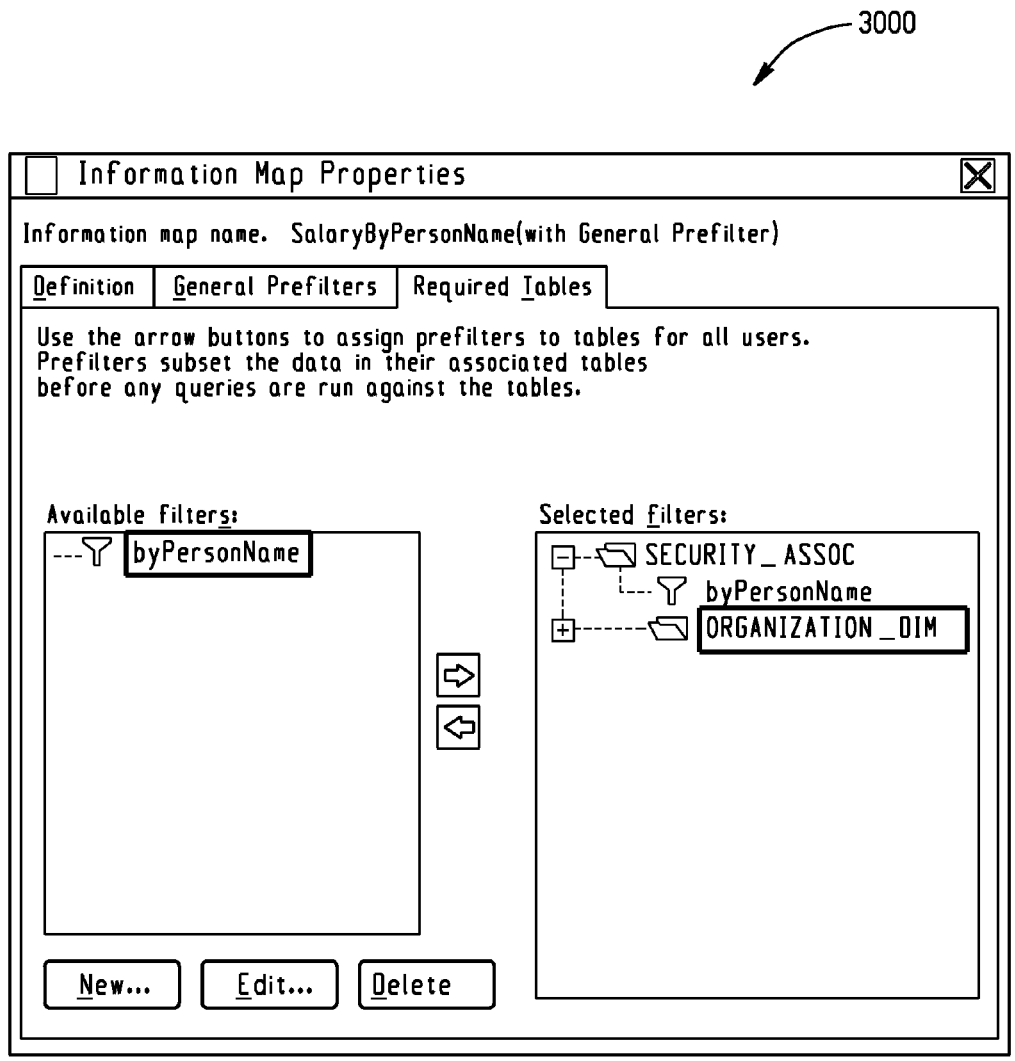

3 To assign the filter as a general prefilter, complete these steps:

a Select Edit ▶Properties ▶Information Map.

b In the Information Map Properties dialog box, select the General Prefilters tab on GUI 2900 in FIG. 32.

c In the Selected Filters box, select the SECURITY_ASSOCIATIONS table.

d In the Available Filters box, select the byPersonName filter.

e Click the right arrow button to assign the byPersonName filter to the SECURITY_ASSOC table, and then click the OK button.

4 Select File ▶Save to save the information map.

Users who have physical access to the data can test by logging on to SAS Information Map Studio and running test queries. To verify that the filter is working as expected, log on using different accounts. For example:

For a user who is not included in the security associations table (such as the SAS Demo User), no salaries should be retrieved.

For the president of the company, all salaries should be retrieved. Note that by default only 100 rows of data are returned when you test an information map.

For a mid-level manager, a subset of salaries should be retrieved.

To run a test query from within SAS Information Map Studio, complete these steps:

1 Select Tools ▶Test from the main menu.

2 In the Test the Information Map dialog box, use the arrow button to add the Salary and Employee Name items to the Selected Items box.

3 Click Run Test and then examine the data in the Results window.

4 To test using another account, close the information map, and then select File ▶Switch Metadata Profile from the main menu.

Note: Final verification, and verification for users who do not have physical access to the data, must be performed from within SAS Web Report Studio.

Variation 1: Use a Different Property for Filtering

Figure 33:
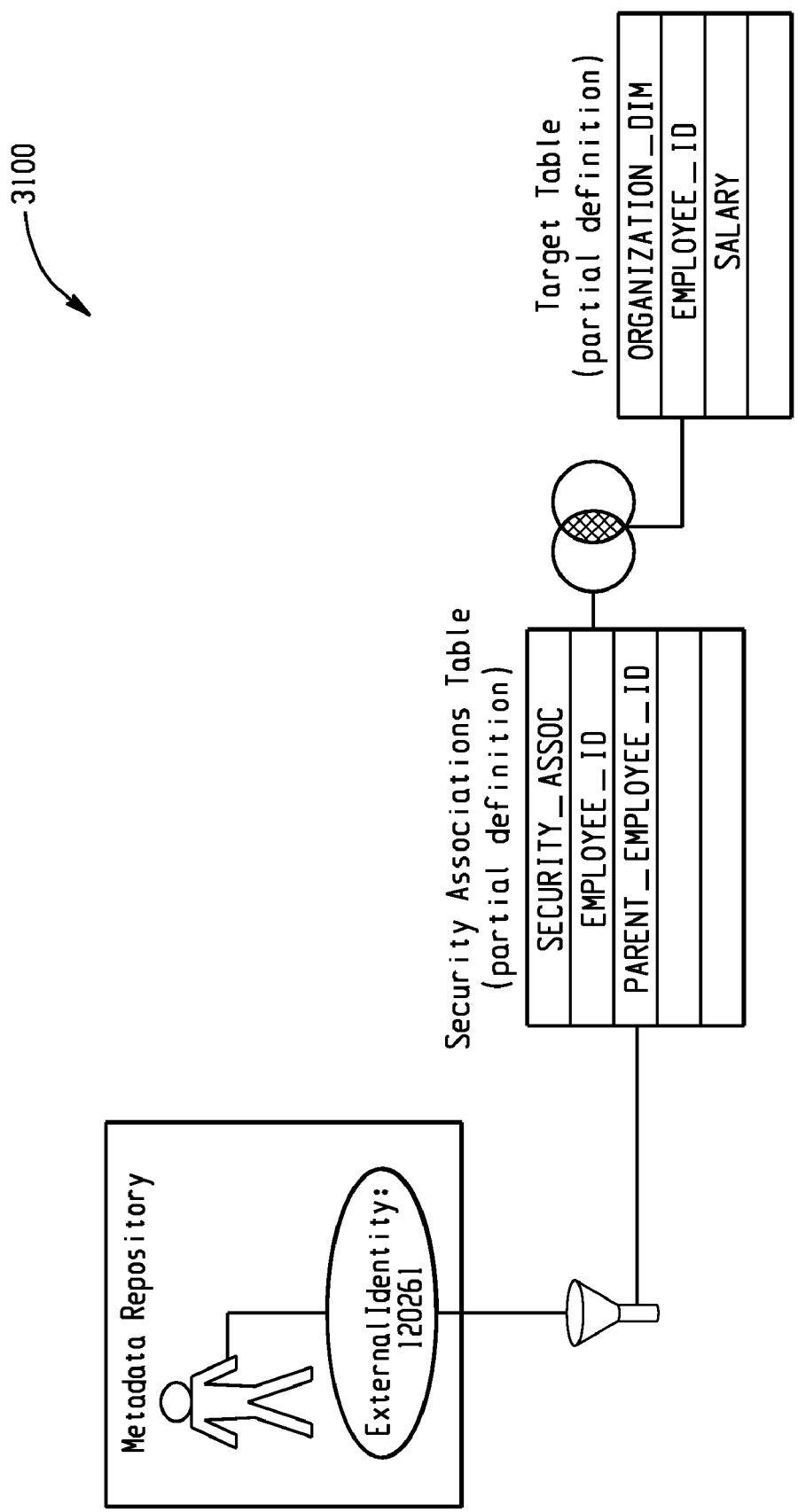
FIG. 33 depicts an example of salary filtering via the SAS.ExternalIdentity property.

If the target data only identified parent employees by their company ID (rather than also by their employee name), then you would need to use a different identity-driven property to accomplish this filtering. The SAS ExternalIdentity of each requesting user is used to filter the security associations table, based on corresponding values in the PARENT_EMPLOYEE_ID column. This filtering yields a subset of rows that includes all employees who report (directly or indirectly) to the requesting user. That subset of rows is then inner joined to the table that contains salary information, so that only the salaries of employees who report to the requesting user are returned. FIG. 33 illustrates at 3100 how this filtering could be accomplished.

Note: This variation assumes that bulk-load macros were used to create the metadata identities in the deployment. As part of the user import process, the company's employee IDs were added to the repository as SAS ExternalIdentity values.

The implementation process for this variation is very similar to the previous example. The only differences are in step 2—the filter creation process. This variation differs from the preceding example in these ways:

In step 2c you would select a different physical data item (PARENT_EMPLOYEE_ID rather than PARENT_EMPLOYEE_NAME).

In step 2f you would select a different identity-driven property (SAS ExternalIdentity rather than SAS PersonName).

Note: The Derive Identity Values selection in the New Filter dialog box is available only when you are defining a filter for a character data item.

Variation 2: Apply Different Filtering Logic to Different Groups

This variation addresses the following additional business requirements:

Four people who work in a Human Resources management department must be able to view salary information for all employees. You have created a user-defined group in the metadata repository for the users (the group name is HR All Salaries).

Users who do not have individual metadata identities must not be able to see any of the data. These users have the access that has been defined for the PUBLIC group.

The first part of the implementation process for meeting these requirements is the same as steps 1 and 2 in the main example. To meet the business requirements in this variation, you must set some specific access controls at the level of the entire information map and then assign the filter as an authorization-based prefilter that will apply only to one particular group of users (rather than as a general prefilter, which has a universal effect).

The permissions that you will set are summarized in the following table:

| Table Information Map Controls | |
| --- | --- |
| Access Class (User Group) | Information Map |
| All rows (Human Resources) | Grant R, RM |
| No rows (PUBLIC) | Deny[1] R, RM |
| Some rows (SASUSERS) | Grant[2], RM |

[1]The information map in this example exists only for the purpose of obtaining salary information, so the "No rows" users do not need to be able to see or use this information map.
[2]To narrow this direct grant of Read permission as appropriate for each member of SASUSERS, you can use the byPersonName filter that you created in the main example.

To set these permissions, complete the following steps:

1 Prepare the information by using either of these methods:

To create a new information map for this variation, follow the instructions for steps 1 and 2 in the main example. Use a name such as SalaryByPersonName (with AuthBasedPreFilter) when you save the information map.

To reuse the information map from the main example, save that map with a different name and then deassign any filters that were assigned on the General Prefilters tab.

2 With the information map open, select Tools ▶Authorization to open the Authorization dialog box.

3 In the Names box, select PUBLIC as shown in GUI 3200 of FIG. 34. In the Permissions list, select the Deny check box for the Read and ReadMetadata permissions.

Note: Make sure that the check boxes as here and elsewhere for the Read and ReadMetadata permissions have a white background color. This indicates that these settings are direct permissions.

Figure 35:
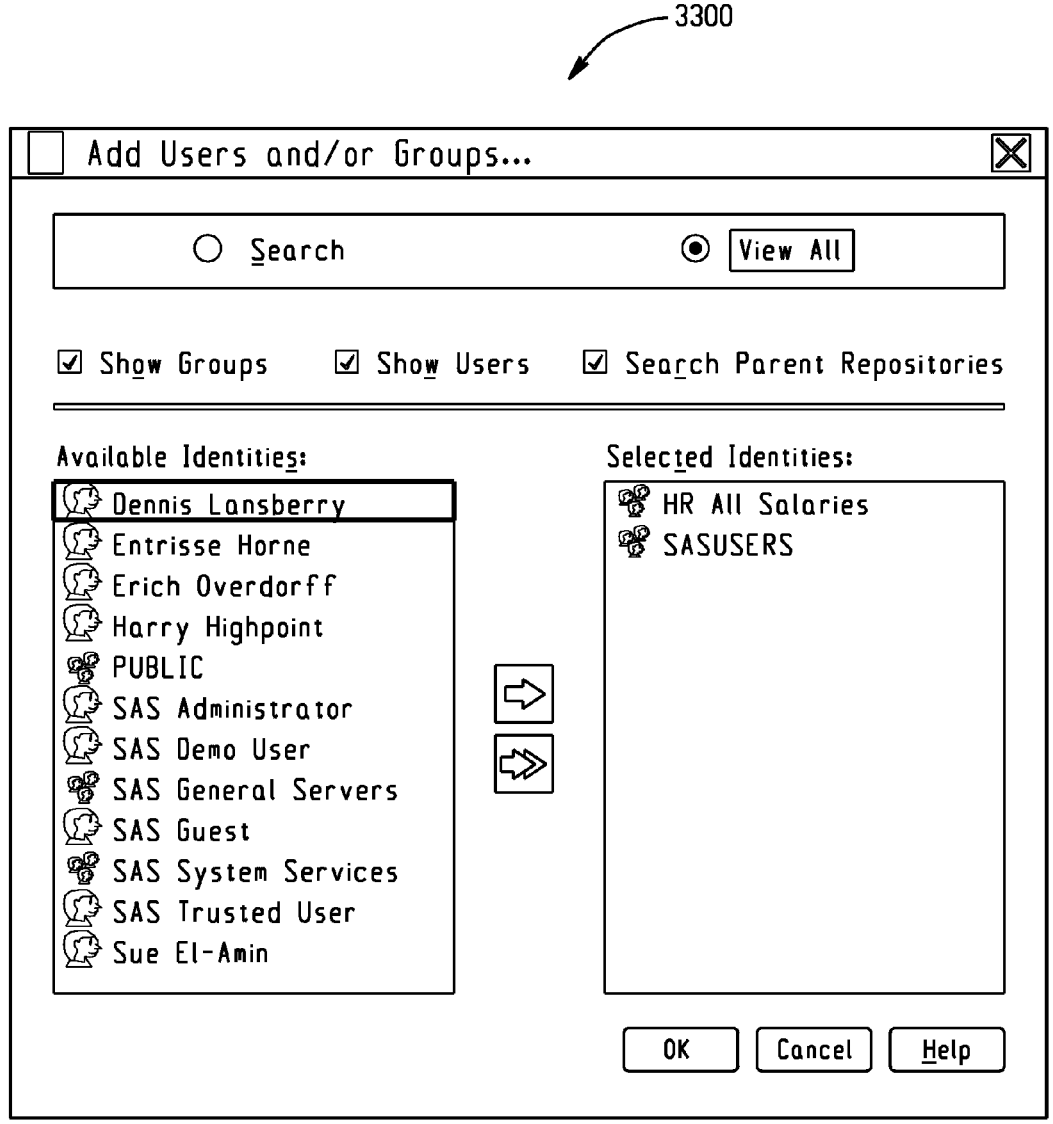

4 To add the HR All Salaries and SASUSERS group identities to the Names box, click Add, select these groups as shown in GUI 330 of FIG. 35 in the Add Users and/or Groups dialog box, and then click OK.

Figure 36:
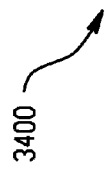

5 In the Names box, examine the settings for the SASUSERS group identity as shown in GUI 3400 of FIG. 36.

Figure 37:
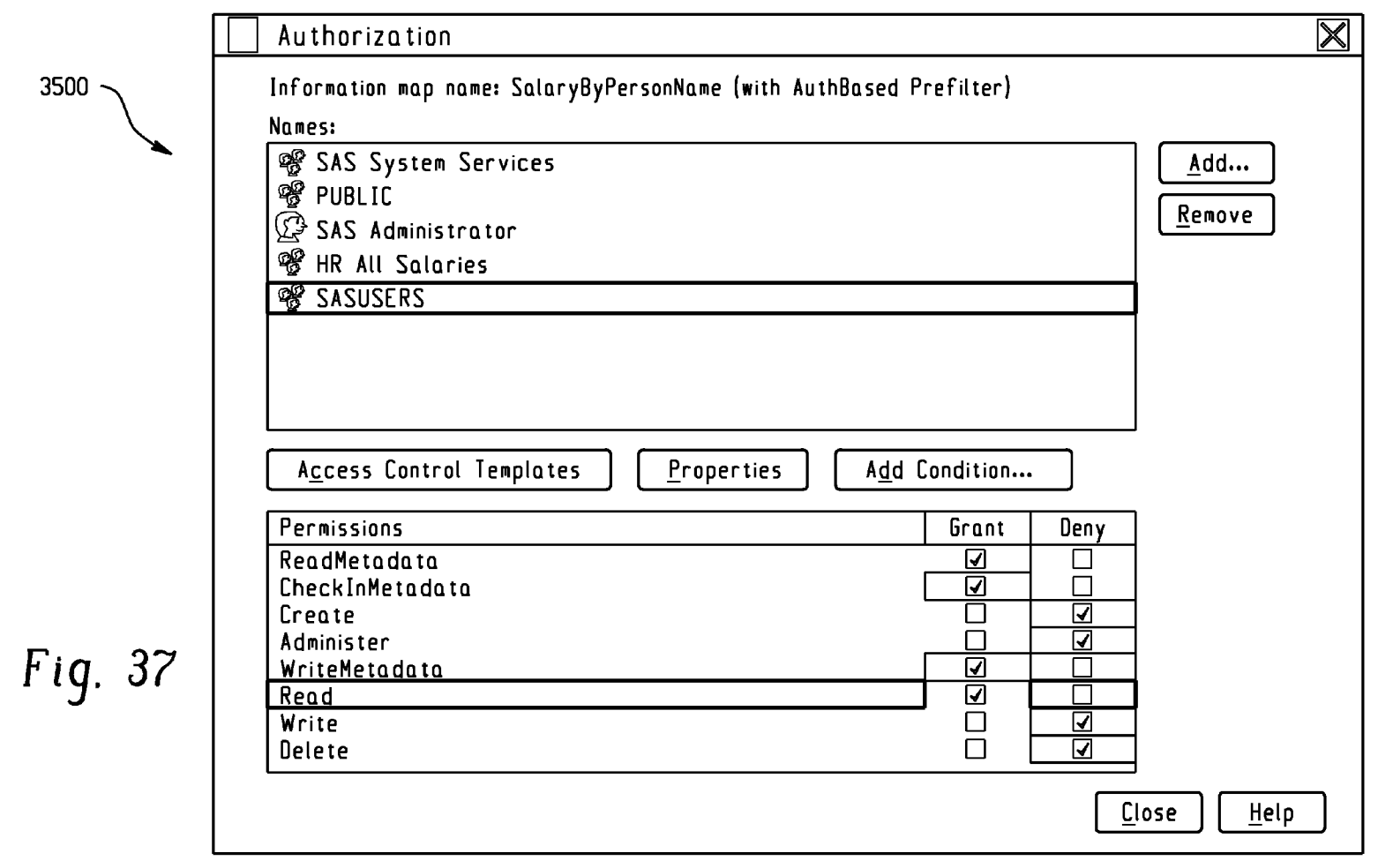

In the Permissions list, select as shown in the GUI 3500 of FIG. 37 the Grant check boxes to directly assign the Read and ReadMetadata permissions for this information map to the SASUSERS group.

6 To limit the grant of Read permission that you just gave to the SASUSERS group, assign the byPersonName filter to that group as an authorization-based prefilter. Complete these steps:

a Click Add Condition to open the Row-Level Permission Condition dialog box.

Figure 38:
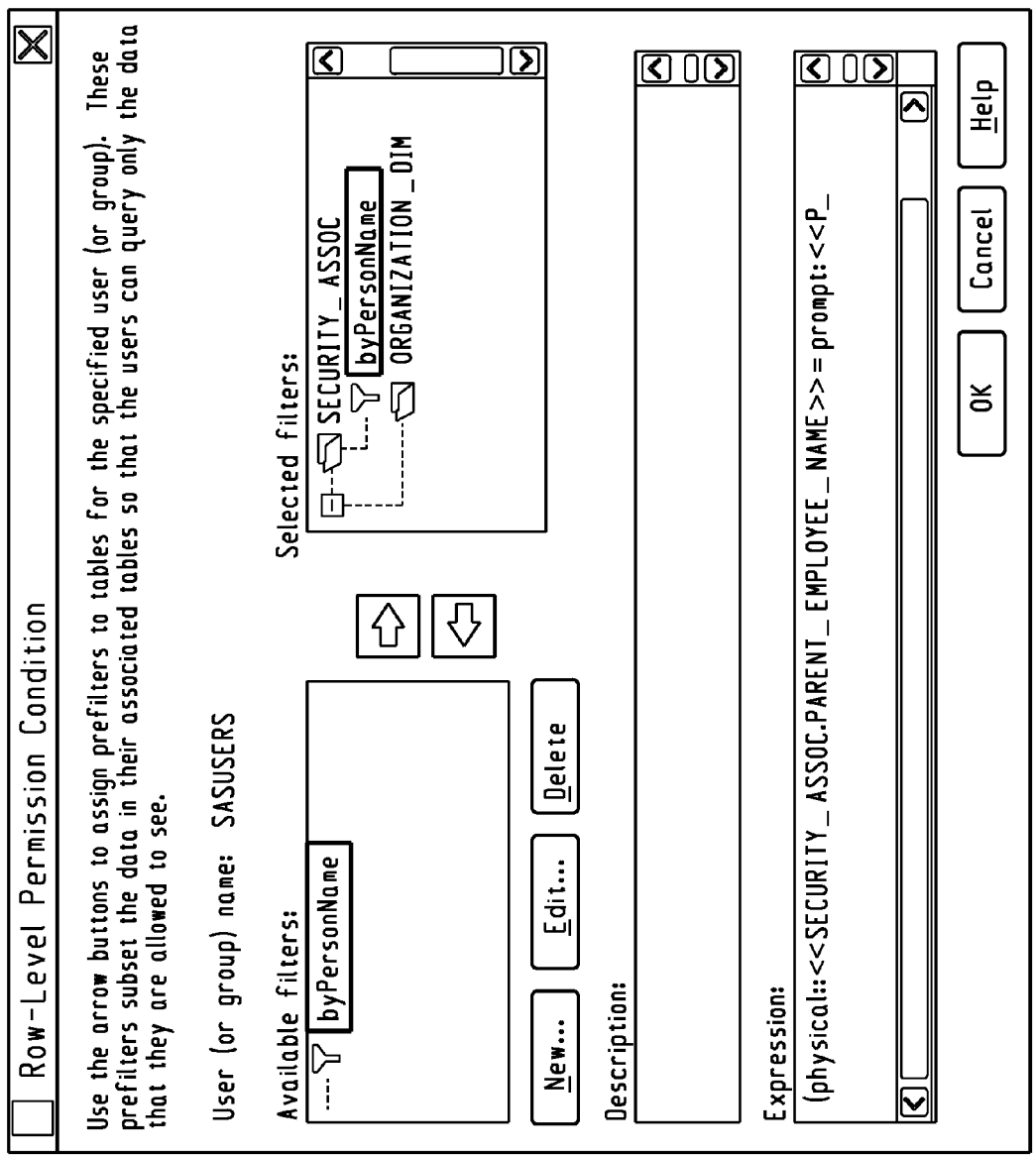

Note: As the preceding figures illustrate, the Add Condition button became available when you added a direct grant of Read permission.

b In the Selected filters list, select the SECURITY_ASSOC table.

c In the Available filters list, select as shown in GUI 3600 of FIG. 38 the byPersonName filter and then use the arrow button to move that filter to the Selected filters list.

Note: Unlike a filter that you assign on the General Prefilters tab, this filter will apply only to members of the SASUSERS group as evaluated according to the identity hierarchy and access control precedence rules.

d Click OK to close the Row-Level Permission Condition dialog box.

7 In the Names box, select the HR All Salaries group identity as shown in GUI 3700 of FIG. 39. In the Permissions list, select the Grant check box for the Read and ReadMetadata permissions. (white background).

Note: Because you want this group to be able to view all salaries, you will not constrain the direct grant of Read permission by adding a permission condition.

8 In the Authorization dialog box, click Close.

9 To make your changes take effect, save the information map.

With these access controls in place, the rows that are retrieved vary as follows:

Users who do not have individual metadata identities will not be able to see or use the information map.

Users who have individual metadata identities but are not listed in the security associations table will see the information map, but will retrieve no rows.

Users who have individual metadata identities, are listed in the security associations table, and are not members of the HR All Salaries group will be able to view only those rows that contain data for their direct and indirect reports.

Users who are members of the HR All Salaries group will be able to retrieve all rows.

As additional examples of the wide scope of the systems and methods disclosed herein it is further noted that the systems and methods may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for providing row-level security, comprising:
    receiving, by one or more computer processors, a query from a user associated with an organization for data contained in a data table, wherein the data table contains one or more rows, wherein each row contains data, and wherein each row is associated with a person;
    accessing, by the one or more computer processors, a multi-table data model including a non-security related query policy which guides and governs the query against data warehouses of the organization, wherein
        the multi-table data model associates a row-level security policy with the data table,
        the row-level security policy controls access permissions to the data table based on identity of the user and references a sparse hierarchical security table including a hierarchical structure of the organization,
        the hierarchical structure identifies the user and any persons subordinate to the user in the organization, and
        each row of the sparse hierarchical security table includes only direct relationships of the user to other persons in the hierarchical structure;
    deriving a robust hierarchical security table from the sparse hierarchical security table when the multi-table data model is accessed, wherein each row of the robust hierarchical security table includes either direct or indirect relationships of the user to the other persons in the hierarchical structure;
    using, by the one or more computer processors, the multi-table data model to augment the query to include a JOIN-based filter and a WHERE-based filter that includes the robust hierarchical security table having the hierarchical structure, wherein the augmented query complies with the non-security related query policy and references the robust hierarchical security table;
    using, by the one or more computer processors, the augmented query to access one or more rows in the data table, wherein access to the one or more rows is dynamically filtered based upon the hierarchical structure contained in the robust hierarchical security table, wherein
        the direct and indirect relationships are used to dynamically filter access to the one or more rows,
        the dynamic filtering is done without additional traversal of the robust hierarchical security table to derive indirect relationships between the user and the persons subordinate to the user; and
    providing, by the one or more computer processors, access to data contained in rows of the data table associated with the user and rows associated with the persons subordinate to the user.

2. The computer-implemented method of claim 1, wherein each table contains one or more columns, and wherein the multi-table data model defines which of the one or more columns are used to join particular tables.

3. The computer-implemented method of claim 1, wherein the multi-table data model further includes pre-defined filters.

4. The computer-implemented method of claim 1, further comprising:
    providing a graphical interface for defining the non-security related query policy, query guidance metadata, and the row-level security policy;
    wherein the query guidance metadata provides guidance for creating the query.

5. The computer-implemented method of claim 1, wherein the multi-table data model includes a second row-level security policy, wherein the second row-level security policy is selectively enabled by applying permission conditions within an authorization system.

6. The computer-implemented method of claim 1, wherein the one or more rows accessed in the data table are provided to a query tool or a reporting tool.

7. The computer-implemented method of claim 1, wherein the row-level security policy lists the data table as a data source.

8. The computer-implemented method of claim 1, wherein the data contained in the data table includes employee information.

9. The computer-implemented method of claim 1, wherein the data accessed in the rows of the data table are displayed in a report.

10. The computer-implemented method of claim 9, wherein the report is provided to two different users, and wherein the data displayed for a first user is a subset of the data displayed for a second user based on the first user being subordinate to the second user.

11. A system for providing row-level security, comprising:
    one or more computer processors;
    one or more non-transitory computer-readable storage media containing instructions configured to cause the one or more computer processors to perform operations including:
        receiving, by the one or more computer processors, a query from a user associated with an organization for data contained in a data table, wherein the data table contains one or more rows, wherein each row contains data, and wherein each row is associated with a person;
        accessing, by the one or more computer processors, a multi-table data model including a non-security related query policy which guides and governs the query against data warehouses of the organization, wherein
            the multi-table data model associates a row-level security policy with the data table,
            the row-level security policy controls access permissions to the data table based on identity of the user and references a sparse hierarchical security table including a hierarchical structure of the organization,
            the hierarchical structure identifies the user and any persons subordinate to the user in the organization, and
            each row of the sparse hierarchical security table includes only direct relationships of the user to other persons in the hierarchical structure;
        deriving a robust hierarchical security table from the sparse hierarchical security table when the multi-table data model is accessed, wherein each row of the robust hierarchical security table includes either direct or indirect relationships of the user to the other persons in the hierarchical structure;
        using, by the one or more computer processors, the multi-table data model to augment the query to include a JOIN-based filter and a WHERE-based filter that includes the robust hierarchical security table having the hierarchical structure, wherein the augmented query complies with the non-security related query policy and references the robust hierarchical security table;

using, by the one or more computer processors, the augmented query to access one or more rows in the data table, wherein access to the one or more rows is dynamically filtered based upon the hierarchical structure contained in the robust hierarchical security table, wherein
- the direct and indirect relationships are used to dynamically filter access to the one or more rows,
- the dynamic filtering is done without additional traversal of the robust hierarchical security table to derive indirect relationships between the user and the persons subordinate to the user; and providing, by the one or more computer processors, access to data contained in rows of the data table associated with the user and rows associated with the persons subordinate to the user.

12. A computer program product for providing row-level security, tangibly embodied in a non-transitory machine-readable storage medium, including instructions configured to cause a computer system to:

receive, by one or more computer processors, a query from a user associated with an organization for data contained in a data table, wherein the data table contains one or more rows, wherein each row contains data, and wherein each row is associated with a person;

access, by the one or more computer processors, a multi-table data model including a non-security related query policy which guides and governs the query against data warehouses of the organization, wherein
- the multi-table data model associates a row-level security policy with the data table,
- the row-level security policy controls access permissions to the data table based on identity of the user and references a sparse hierarchical security table including a hierarchical structure of the organization,
- the hierarchical structure identifies the user and any persons subordinate to the user in the organization, and
- each row of the sparse hierarchical security table includes only direct relationships of the user to other persons in the hierarchical structure;

derive a robust hierarchical security table from the sparse hierarchical security table when the multi-table data model is accessed, wherein each row of the robust hierarchical security table includes either direct or indirect relationships of the user to the other persons in the hierarchical structure;

use, by the one or more computer processors, the multi-table data model to augment the query to include a JOIN-based filter and a WHERE-based filter that includes the robust hierarchical security table having the hierarchical structure, wherein the augmented query complies with the non-security related query policy and references the robust hierarchical security table;

use, by the one or more computer processors, the augmented query to access one or more rows in the data table, wherein access to the one or more rows is dynamically filtered based upon the hierarchical structure contained in the robust hierarchical security table, wherein
- the direct and indirect relationships are used to dynamically filter access to the one or more rows,
- the dynamic filtering is done without additional traversal of the robust hierarchical security table to derive indirect relationships between the user and the persons subordinate to the user; and provide, by the one or more computer processors, access to data contained in rows of the data table associated with the user and rows associated with the persons subordinate to the user.

* * * * *